(12) United States Patent
Soejima et al.

(10) Patent No.: US 7,424,586 B2
(45) Date of Patent: Sep. 9, 2008

(54) DATA PROCESSING METHOD WITH RESTRICTED DATA ARRANGEMENT, STORAGE AREA MANAGEMENT METHOD, AND DATA PROCESSING SYSTEM

(75) Inventors: Kenichi Soejima, Odawara (JP); Ayumi Mikuma, Kawasaki (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 11/300,516

(22) Filed: Dec. 15, 2005

(65) Prior Publication Data
US 2006/0095698 A1   May 4, 2006

Related U.S. Application Data

(63) Continuation of application No. 10/698,453, filed on Nov. 3, 2003, now Pat. No. 7,080,224.

(30) Foreign Application Priority Data
Jul. 9, 2003   (JP)   ............... 2003-194050

(51) Int. Cl.
*G06F 12/00* (2006.01)
(52) U.S. Cl. ................ 711/165; 707/204
(58) Field of Classification Search ........ 711/165; 707/204
See application file for complete search history.

(56) References Cited

U.S. PATENT DOCUMENTS

| | | | |
|---|---|---|---|
| 3,742,458 A | 6/1973 | Inoue et al. | |
| 5,394,539 A | 2/1995 | Neuhard et al. | 711/209 |
| 5,873,103 A | 2/1999 | Trede et al. | 707/204 |
| 5,895,501 A | 4/1999 | Smith | 711/207 |
| 5,978,810 A | 11/1999 | Mitchell et al. | 707/102 |
| 5,996,047 A | 11/1999 | Peacock | 711/118 |
| 6,034,832 A | 3/2000 | Ichimura et al. | 360/60 |
| 6,192,359 B1 | 2/2001 | Tsuchida et al. | 707/4 |
| 6,192,361 B1 * | 2/2001 | Huang | 707/9 |
| 6,269,431 B1 * | 7/2001 | Dunham | 711/162 |
| 6,292,198 B1 | 9/2001 | Matsuda et al. | 345/473 |

(Continued)

FOREIGN PATENT DOCUMENTS

EP   1187022   3/2002

(Continued)

*Primary Examiner*—Kevin Ellis
*Assistant Examiner*—Hashem Farrokh
(74) *Attorney, Agent, or Firm*—Mattingly, Stanger, Malur & Brundidge, P.C.

(57) ABSTRACT

When copying data, it is desired to securely execute data management by preventing violation of rules or leaking out of secret information by administrative error. For this purpose, in a data processing method, for each storage area such as a volume in a storage device or a logical volume, a possible data arrangement range of data included in the storage area is stored. In addition, range information is defined for a copy-destination storage area. Then, when copying data in a storage area, a judgment is made as to whether or not the range information of the copy-destination storage area is within the possible data arrangement area of the data. If the range information is within the possible data arrangement area, copying will be executed. If the range information is not within the possible arrangement area, the copy processing will not be initiated.

9 Claims, 26 Drawing Sheets

U.S. PATENT DOCUMENTS

| | | |
|---|---|---|
| 6,292,874 B1 | 9/2001 | Barnett ................. 711/153 |
| 6,385,706 B1 | 5/2002 | Ofek et al. ............. 711/162 |
| 6,567,865 B1 | 5/2003 | Araki et al. ............ 710/36 |
| 6,574,706 B2 | 6/2003 | Sutherland et al. ...... 711/117 |
| 6,578,039 B1 | 6/2003 | Kawamura ............... 707/100 |
| 6,633,953 B2 | 10/2003 | Stark .................. 711/108 |
| 6,681,303 B1 | 1/2004 | Watanabe et al. |
| 6,681,310 B1 | 1/2004 | Kusters et al. ......... 711/202 |
| 6,684,210 B1 | 1/2004 | Takechi et al. ......... 707/90 |
| 6,718,352 B1 | 4/2004 | Dang et al. ............ 707/205 |
| 6,721,823 B2 | 4/2004 | Araki et al. ........... 710/36 |
| 6,748,383 B1 | 6/2004 | Wada et al. |
| 2001/0049749 A1 | 12/2001 | Katsuragi et al. ....... 709/248 |
| 2002/0029263 A1 | 3/2002 | Toyoshima et al. ....... 709/223 |
| 2002/0075281 A1 | 6/2002 | Suzuki et al. .......... 345/619 |
| 2003/0028737 A1 | 2/2003 | Kaiya et al. ........... 711/162 |
| 2003/0061456 A1* | 3/2003 | Ofek et al. ............ 711/162 |
| 2003/0093439 A1 | 5/2003 | Mogi et al. ............ 707/200 |
| 2003/0093442 A1 | 5/2003 | Mogi et al. ............ 707/203 |
| 2003/0105852 A1 | 6/2003 | Das et al. ............. 709/223 |
| 2003/0135783 A1 | 7/2003 | Martin et al. .......... 714/13 |
| 2003/0167312 A1 | 9/2003 | Mori ................... 709/212 |
| 2003/0167316 A1 | 9/2003 | Bramnick et al. ........ 709/219 |
| 2003/0177379 A1 | 9/2003 | Hori et al. ............ 713/193 |
| 2003/0182306 A1 | 9/2003 | Maeda .................. 707/103 |
| 2004/0044649 A1 | 3/2004 | Yamato et al. .......... 707/1 |
| 2004/0059882 A1* | 3/2004 | Kedem et al. ........... 711/162 |
| 2004/0225697 A1 | 11/2004 | Asano et al. |

FOREIGN PATENT DOCUMENTS

| | | |
|---|---|---|
| JP | 6-187377 | 7/1994 |
| JP | 06187377 | 7/1994 |
| JP | 8-190378 | 7/1996 |
| JP | 08190378 | 7/1996 |
| JP | 9-6682 | 1/1997 |
| JP | 9-34758 | 2/1997 |
| JP | 09034758 | 2/1997 |
| JP | 2001-103047 | 4/2001 |
| JP | 2001-142751 | 5/2001 |
| JP | 2001142751 | 5/2001 |

* cited by examiner

FIG. 8

| 3010 | 4000 | 4010 | |
|---|---|---|---|
| | DATA IN VOLUME 3100 | COMPANY: A OR COMPANY B | 4100 |
| | DATA IN VOLUME 3110 | GROUP: INFORMATION GROUP OF COMPANY A | 4110 |

FIG. 9

| 3020 | 5000 | 5010 | |
|---|---|---|---|
| | INFORMATION GROUP OF COMPANY A | INSTITUTE A, OFFICE B, OFFICE C | 5100 |
| | AFFILIATED COMPANY OF COMPANY A | COMPANY A, COMPANY B, COMPANY C, COMPANY D | 5110 |
| | COUNTRY WHERE COMPANY A HAS AN OVERSEAS BRANCH OFFICE | COUNTRY A, COUNTRY B, COUNTRY C | 5120 |
| | BUSINESS TIE-UP COMPNAY OF COMPANY A | COMPANY E, COMPANY F | 5130 |
| | COUNTRY SUBJECTED TO INFORMATION TECHNOLOGY EXPORT RESTRICTION | COUNTRY X, COUNTRY Y, COUNTRY Z | 5140 |

FIG. 10

| 3660 | 6000 | 6010 | |
|---|---|---|---|
| | COUNTRY | JAPAN | 6100 |
| | COMPANY | COMPANY A | 6110 |
| | OFFICE | OFFICE C | 6120 |
| | DEPARTMENT | DEPARTMENT F | 6130 |
| | PROJECT | PROJECT X | 6140 |

| LOGICAL VOLUME E | COMBINED VOLUMES A AND B IN THE STORAGE DEVICE 2030 |
|---|---|
| LOGICAL VOLUME F | VOLUME C IN THE STORAGE DEVICE 2040 |
| LOGICAL VOLUME G | VOLUME D IN THE STORAGE DEVICE 2040 |
| LOGICAL VOLUME H | COMBINED VOLUMES C AND D IN THE STORAGE DEVICE 2040 |

| FILE SYSTEM A | ADDRESSES 0000 TO 00FF IN THE LOGICAL VOLUME E |
|---|---|
| FILE SYSTEM B | ADDRESSES 0100 TO FFFF IN THE LOGICAL VOLUME E |

| LOGICAL VOLUME F | OFFICE B |
|---|---|
| LOGICAL VOLUME G | OFFICE B |
| LOGICAL VOLUME H | DEPARTMENT D |

| FILE | FILE E | DEPARTMENT D |
| --- | --- | --- |
| | FILE F | OFFICE B |
| FILE SYSTEM | FILE SYSTEM A | DEPARTMENT D |
| | FILE SYSTEM B | COMPANY A |
| LOGICAL VOLUME | LOGICAL VOLUME E | DEPARTMENT D |
| VOLUME | VOLUME C | DEPARTMENT D |

FIG. 24

| | |
|---|---|
| VOLUME A | OFFICE B |
| VOLUME B | OFFICE C |

| | | | |
|---|---|---|---|
| STORAGE DEVICE 2030 | VOLUME A | IN-USE | 8,124 |
| | VOLUME B | IN-USE | 32,556 |
| STORAGE DEVICE 2040 | VOLUME C | IN-USE | 4,096 |
| | VOLUME D | UNUSED | 13,328 |
| | VOLUME E | UNUSED | 2,048 |

| | VOLUME D | VOLUME E |
|---|---|---|
| COUNTRY | JAPAN | JAPAN |
| COMPANY | COMPANY A | COMPANY B |
| OFFICE | OFFICE B | OFFICE P |
| DEPARTMENT | DEPARTMENT D | DEPARTMENT R |
| PROJECT | PROJECT X | PROJECT A |

30000, 30050, 30100, 30200, 30250, 30300, 30350, 30400, 30450

| CLIENT'S COMPUTER A | OFFICE P |
|---|---|
| CLIENT'S COMPUTER B | DEPARTMENT R |

32750

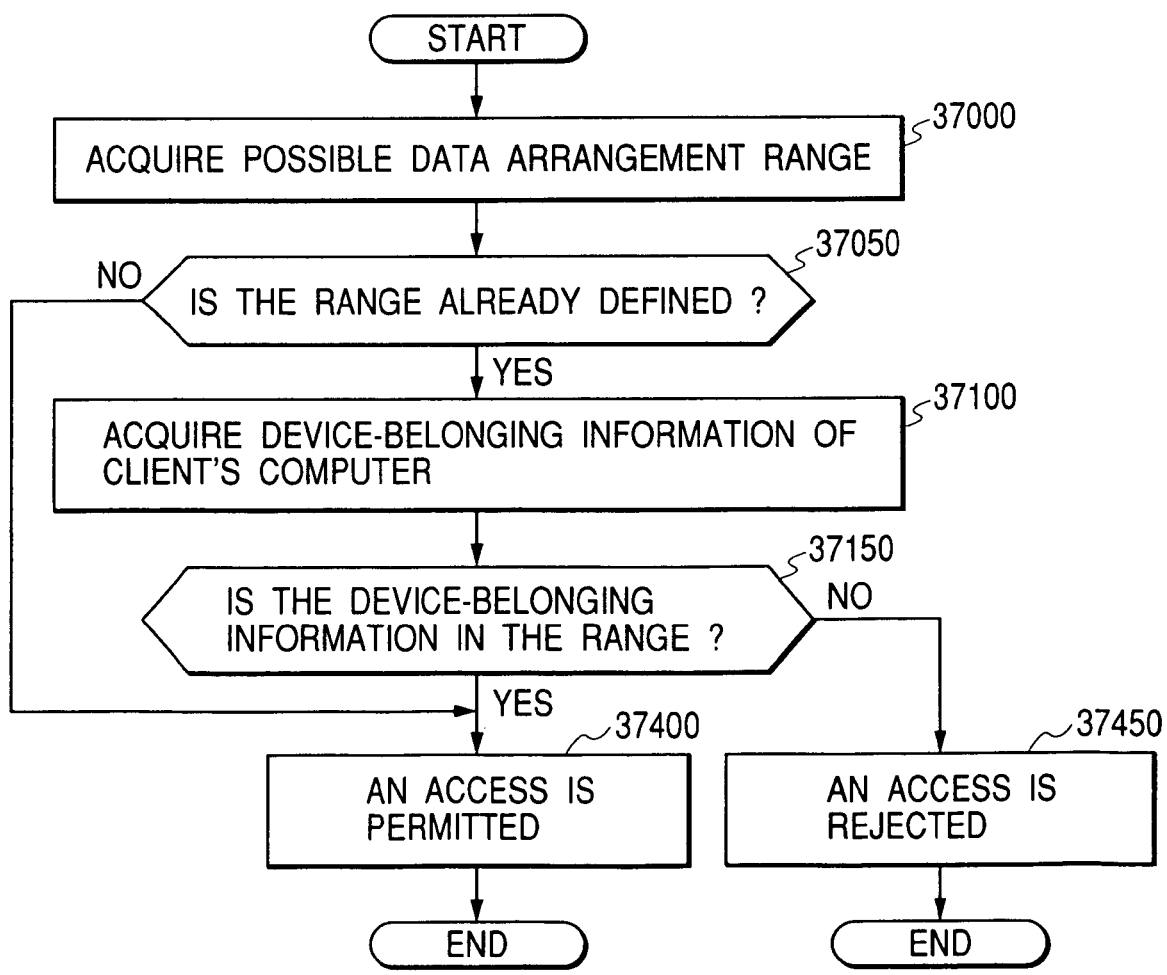

| FILE NAME | POSSIBLE DATA ARRANGEMENT RANGE | FORMAT | SIZE | |
|---|---|---|---|---|
| BASIC SPECIFICATIONS | COMPANY A | TEXT | 114KB | ~41550 |
| FUNCTION SPECIFICATIONS | OFFICE B | FORMAT A | 514KB | ~41600 |
| DETAILS SPECIFICATIONS | OFFICE C | FORMAT B | 830KB | ~41650 |
| API SPECIFICATIONS | COMPANY A, COMPANY B | XML | 1,012KB | ~41700 |

DATA PROCESSING METHOD WITH RESTRICTED DATA ARRANGEMENT, STORAGE AREA MANAGEMENT METHOD, AND DATA PROCESSING SYSTEM

This is a continuation application of U.S. Ser. No. 10/698,453, filed Nov. 3, 2003, now U.S. Pat. No. 7,080,224.

BACKGROUND OF THE INVENTION

The present invention relates to data processing methods and, more particularly to a data processing method used favorably for data processing wherein data should be strictly managed to prevent leakage of secrets at the time of copying and/or moving data.

For data processing with a computer system, there are conventional techniques wherein data is copied in advance in a separate storage area so that critical corporate data may not be lost upon occurrence of an equipment failure or a disaster. Such techniques are generically called "backup." In addition, for example, data is sometimes copied for the purpose of delivering business data within a company.

It should be noted, here, that much of corporate data is subjected to organizational and/or geographical restrictions regarding the range in which data copy or data migration can be made. Hereinafter, such range shall be referred to as "a possible data arrangement range." Examples of information whose possible data arrangement range is restricted include technical information that is prohibited to be exported to specified countries under the export control raw, intra-company classified information, and other company's classified information that is obtained under an agreement with that company.

Examples of techniques to restrict data copying include the one in which an authentication is executed whenever data is accessed, an access is granted only to an authorized client, and accesses are restricted to the number of times specified in advance. Also, some other techniques include the one in which part of data is encrypted, and accesses are restricted by distributing decryption keys only to users who are authorized for reading the data (e.g. Japanese Patent Laid-open No. 09-006682 and Japanese Patent Laid-open No. 2001-103047).

As described above, much of corporate data is subjected to organizational and/or geographical restrictions in terms of the possible data arrangement range. Consequently, when work that accompanies copying or migration of conventionally available data is conducted, it is necessary to consider if the work does not infringe the restriction of the possible data arrangement range. Performing the work while paying attention to the possible data arrangement range requires considerable efforts when the data amount to be controlled is large, and the defined restriction of the possible data arrangement range may not be observed due to a wrong operation by the administrator. When this happens, laws, rules and agreements concerning data handling rules could be violated due to the wrong operation by the administrator while the data owner does not aware of such infringement. In addition, when data that is not in the possible data arrangement range is fraudulently accessed, critical secret information may be leaked out, thus incurring significant job-related losses.

Such problems cannot be solved with techniques to restrict data copying offered by the Japanese Patent Laid-open No. 09-006682 and the Japanese Patent Laid-open No. 2001-103047, both of which refer to related art.

With the technique of the Japanese Patent Laid-open No. 09-006682 to restrict the number of authentications and access times at the time of accessing data, it is necessary to distribute authentication information to all users accessing the above-stated data, and therefore, the data may be fraudulently accessed when the authentication information is leaked out. Further, regarding restriction of the number of accesses, it is not possible to establish a range of restriction, in which, for example, copying can be made unlimitedly within the range, but copying must not be made even once beyond the range.

Likewise, as for the technique to encrypt part of data referred to in the Japanese Patent Laid-open No. 2001-103047, there is a possibility of leaking out of keys, or secret information leaks due to data analysis, and beside that, significant efforts are required to manage the keys (distribution, prevention of leak out, etc.) or to encrypt the data.

An object of the present invention is to provide a data processing method for preventing violation of rules or leaking out of secret information attributed to wrong operation of an administrator, thus enabling data management that offers excellent security protection, at the time of making copies of corporate business data, etc.

SUMMARY OF THE INVENTION

In the present invention, to achieve the above-described object, a possible data arrangement range of data included in a certain storage area is stored for each storage area (a volume, a logical volume, a file system, a file, etc. that are available in a storage device).

In addition, range information is defined for a storage area to which the data is copied, that is, a "copy-destination" storage area.

At the time of copying data that is available in the storage area, a judgment is made whether or not the range information of the copy-destination storage area is within the possible data arrangement range. If it is in the possible data arrangement range, copying is executed. Otherwise, if it is not in the possible data arrangement range, copying is not executed.

Further, at the time of copying data, the possible data arrangement range described above is also copied. When the thus copied data is further copied on another storage area, a judgment will be made as to whether or not the range information of the copy-destination another storage area data is within the possible data arrangement range.

BRIEF DESCRIPTION OF THE DRAWINGS

FIG. 8 is a diagram illustrating the possible data arrangement range of data in a volume;

FIG. 9 is a diagram illustrating group definition information;

FIG. 10 is a diagram illustrating range information of a volume;

FIG. 18 is a diagram showing logical volume definition information;

FIG. 19 is a diagram showing file system configuration information;

FIG. 20 is a diagram showing range information of a logical volume;

FIG. 24 is a diagram showing a possible data arrangement range according to the third preferred embodiment of the present invention;

FIG. 25 is a diagram showing a volume information list;

FIG. 26 is a diagram showing range information of volumes;

FIG. 31 is a diagram showing a possible data arrangement range and typical range information according to the fourth embodiment of the present invention;

FIG. 32 is a flow chart illustrating processing in the access control confirmation unit 32600;

DESCRIPTION OF THE PREFERRED EMBODIMENTS

Hereinafter, preferred embodiments of the present invention will be described with reference to FIGS. 1 to 36.

Basic Concept of the Present Invention

Figure 1:
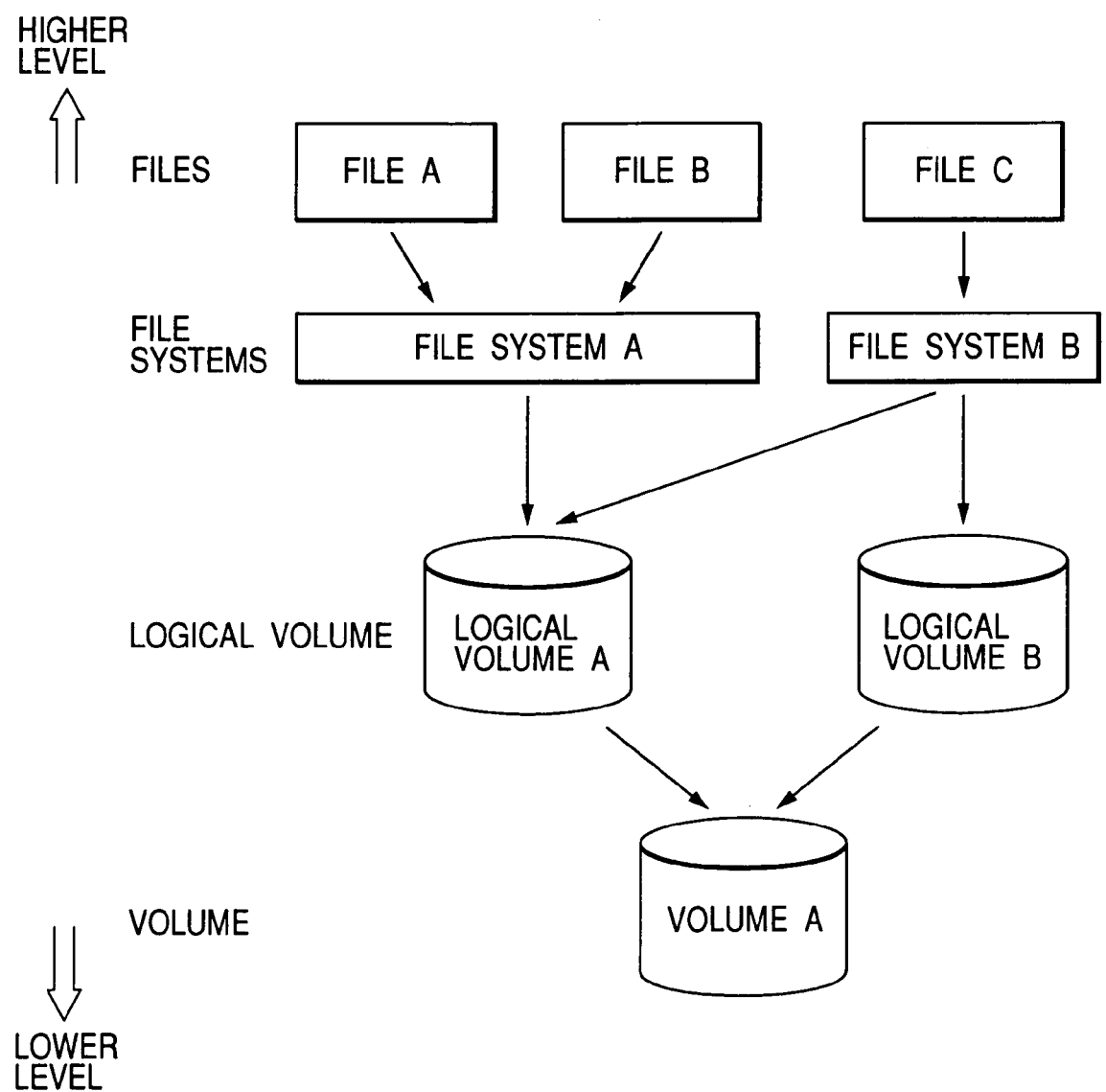
FIG. 1 is a diagram describing a hierarchy of storage areas according to the present invention.
Figure 2:
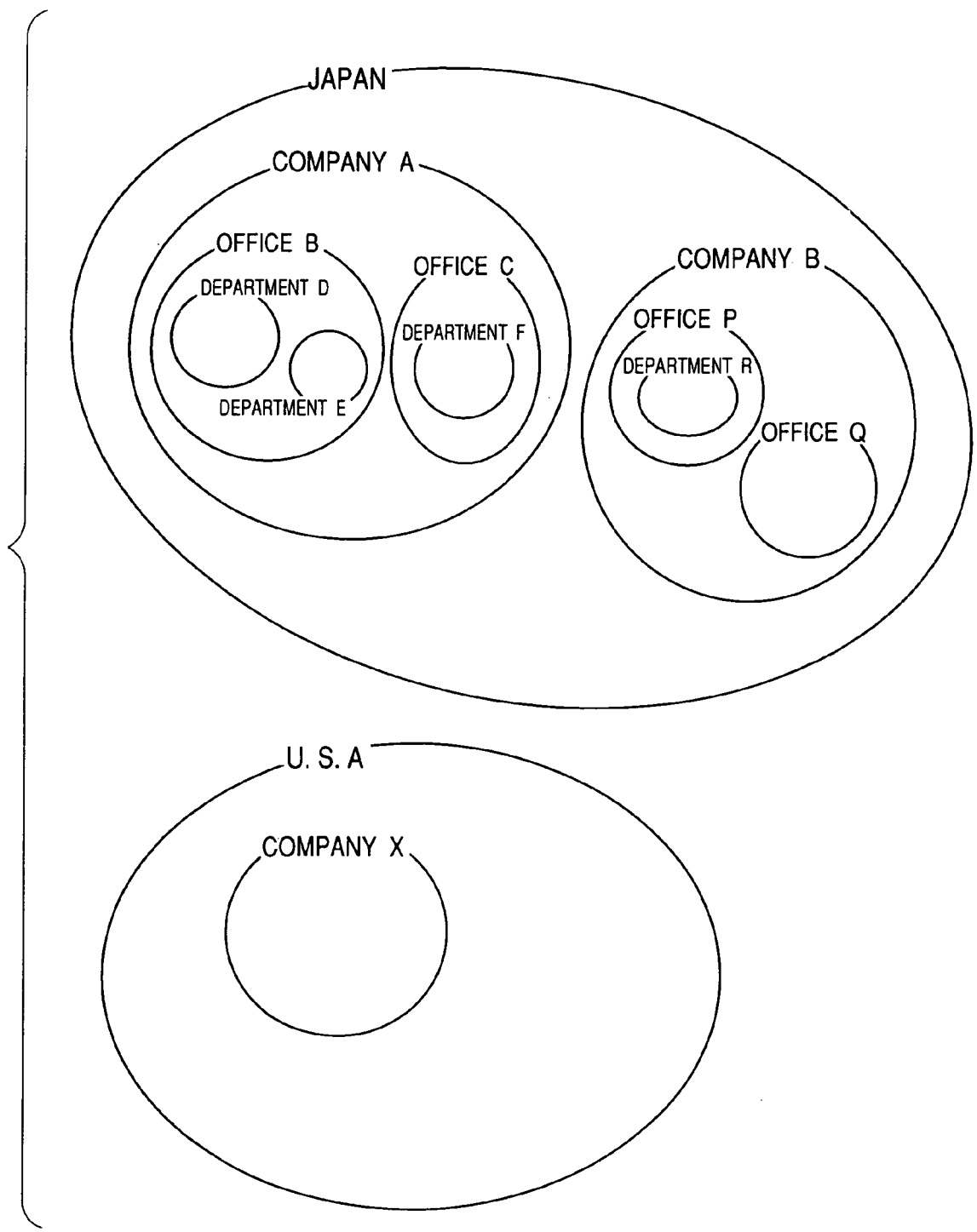
FIG. 2 is a diagram describing a model logical range according to the present invention.
Figure 3:
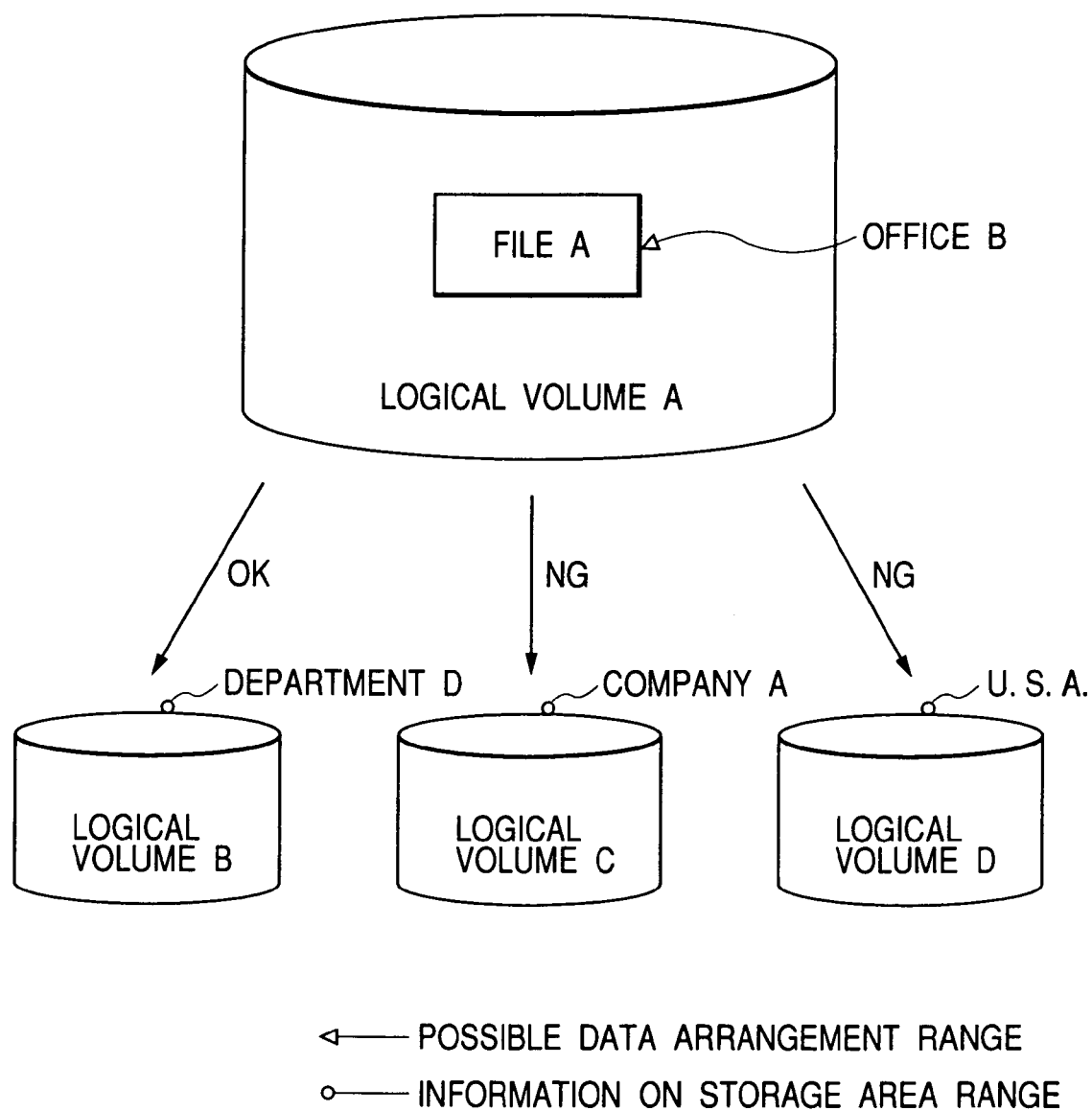
FIG. 3 is a diagram describing copying procedures under a data processing method in which the possible data arrangement range according to the present invention is introduced (Part 1)
Figure 4:
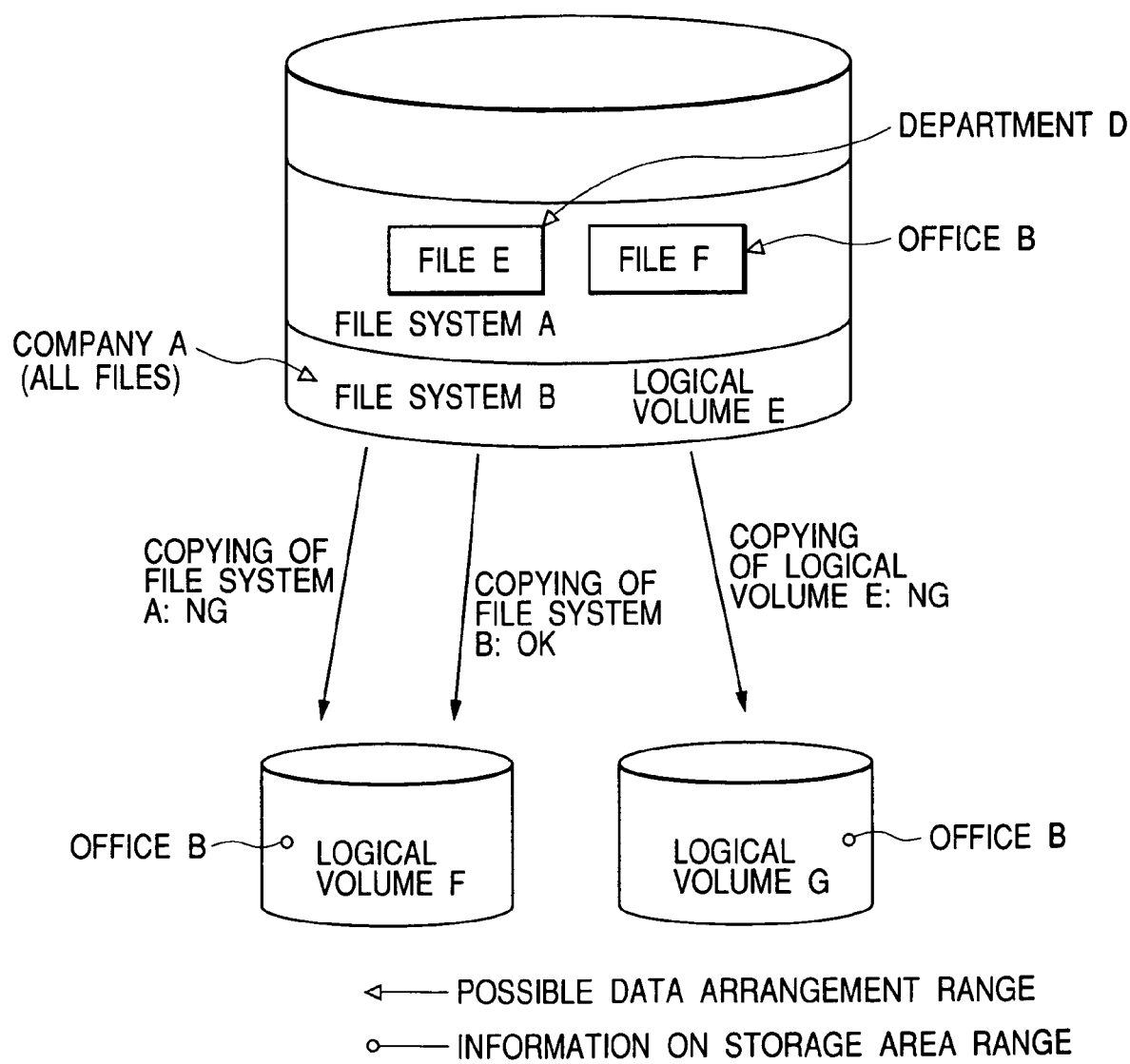
FIG. 4 is a diagram describing copying procedures under a data processing method in which the possible data arrangement range according to the present invention is introduced (Part 2)
Figure 5:
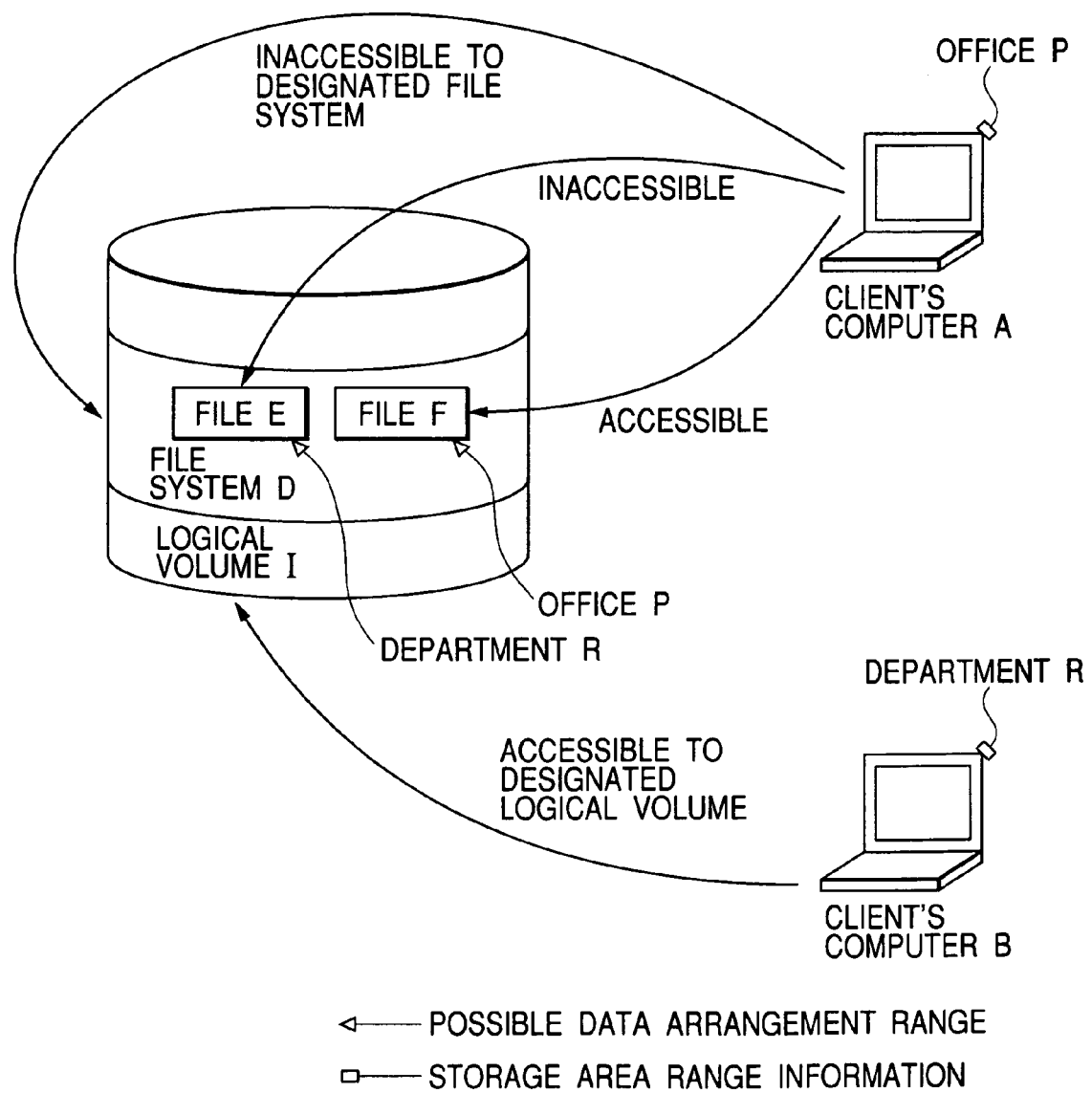
FIG. 5 is a diagram describing accesses from clients for a case where the storage area management method according to the present invention is introduced.

Before describing the preferred embodiments, the basic concept and the outlined ideas of the present invention will be described by referring to FIGS. 1 to 5. FIG. 1 is a diagram describing a hierarchy of storage areas according to the present invention. FIG. 2 is a diagram describing a model logical range for the present invention. FIGS. 3 and 4 are diagrams describing copying procedures under a data processing method in which the possible data arrangement range according to the present invention is introduced. FIG. 5 is a diagram describing accesses from clients for a case where the storage area management method according to the present invention is introduced.

For the purpose of describing the concept of the present invention, a model case will be assumed as a hierarchy of storage areas, wherein the storage area hierarchy is configured, as shown in FIG. 1, in the order of file, file system, logical volume and volume, in the direction from the upper hierarchy, or logical hierarchy to the lower hierarchy, or physical hierarchy. In addition, the upper memory hierarchy is realized by utilizing functions of lower storage areas.

A file is the minimum data unit of the storage areas indicated in FIG. 1. A file system is an area that is formatted in a certain format to store files and information to control files.

A volume is the largest unit of storage area indicated in FIG. 1, which stored data, and, it is most proximate to a physical storage device feeling-wise.

A logical volume is a storage area in which the volume is put in a logical form, and one volume can be handled, as shown in FIG. 1, as a plurality of logical volumes, or conversely, a plurality of volumes can be handled as one logical volume.

Next, in the present invention, a logical range will be assumed as a model that is closely related to business tasks.

In an example shown in FIG. 2, firstly, for the unit level of countries, "Japan" and "U.S.A." are separated. Since governing laws are different in these two ranges, there would be data or secret matters that should be treated carefully.

The logical range in "Japan" incorporates "Company A" for the unit of company, and the lower office level incorporates "Office B", and the further lower level incorporates "Department D", "Department E", etc.

The setting of this logical range shall allow persons in that range to access data belonging to that logical range.

For example, there is such data that, even if the data can be accessed by persons in Department D, accesses are prohibited by persons in Office B which covers a range wider than Department D, that is, such data is treated as secret data for other persons than those in Department D.

Likewise, data that can only be accessed by persons in Office B cannot be accessed by persons in "Office C" or those in other offices, even if all such offices belong to Company A.

Assuming such logical range, the present invention will configure range information of a possible data arrangement range and a storage area.

A possible data arrangement range of data shall imply information on a logical range that allows arrangement of the data.

Range information of a storage area shall imply information on a logical range that is defined for a storage area for the purpose of judging whether certain data should be stored therein or not. When range information of a memory range is defined, all persons belonging to that logical range are considered to have a possibility to access that storage area.

As shown in FIG. 3, it shall be so assumed that a file A is incorporated in a logical volume A, and the possible data arrangement range is "Office B." More specifically, the data shall have been deemed to be data that can be accessed by persons in office B.

Next, assuming a case where the file A is copied to one of other logical volumes.

In the range information of a logical volume B, "Department D" is configured. In this case, copying is permitted since "Office B" which is in the possible data arrangement range of the file A includes "Department D."

In the range information of a logical volume C, "Company A" is configured. In this case, "Office B" which is in the possible data arrangement range of the file A is included in "Company A." More specifically, in this case, copying is prohibited since the logical volume C may be accessed by all persons in "Company A."

Since the range information of a logical volume D is for the "U.S.A.", copying is prohibited, as a matter of course.

As stated in the above, the basic concept of the present invention refers to a method wherein a logical range in a storage system is first determined, a possible data arrangement range is compared with the range information of a storage area, and then whether data can be arranged in that storage area or not is determined.

Next, a situation shown in FIG. 4 will be assumed.

It shall be assumed that a file system A and a file system B are secured in a logical volume E, and the file system A incorporates a file E and a file F. It shall also be assumed that the possible data arrangement range of the file E is "Department D", and the possible data arrangement range of the file F is "Office B." Further, the possible data arrangement range for all data in the file system B is "Company A."

Here, it shall be assumed that a file system is designated, and all data in the file system is copied to another logical volume.

At this time, the file E whose possible data arrangement range is "Department D" and the file F whose possible data arrangement range is "Office B" are included in the file system A. Consequently, for the entire file system A, the possible data arrangement range should be "Department D."

As stated in the above, there is a general rule that, when copying is made in a unit of storage area, the data having the narrowest possible data arrangement range among data included in the storage area can be the applicant. Supposedly, when the data is assumed to be the "typical range information" in the storage area, if, as typical range information, data is arranged in another storage area by picking up the data having the narrowest possible data arrangement range among data included in the typical range information, the comparison can be made with the range information in that storage area.

For example, as shown in FIG. 4, suppose that copying of the file system A is being made under the condition that the range information of the logical volume F is "Office B." Since the typical range information of the file system A is "Department D", and this does not include "Office B", copying is prohibited.

On the other hand, since the possible data arrangement range of all data of the file system B is "Company A", it can be considered that the typical range information of the file system B is also "Company A." Consequently, when the file system B is being copied to the logical volume F, copying is permitted since "Company A" of the typical range information includes the fact that the range information of the logical volume F includes "Office B."

Further, a case will be assumed where the logical volume E is designated and it is copied to a logical volume G wherein the range information is "Office B".

In the logical volume E, lower storage areas of two file systems A and B are included, the typical range information of the file system A is "Department D", and the typical range information of the file system A is "Office B." The typical range information of the logical volume E will be "Department D", which is narrower than "Office B".

From the above, since "Department D" of the typical range information does not include "Office B" of the range information of the logical volume F, copying in logical volume unit will not be permitted.

Next, a case where access is made to certain data from a client computer of a computer system will be assumed.

In the present invention, a definition of "device-belonging information" shall be given to a device, such as a client computer, that is allowed to access system data.

The "device-belonging information" shall imply a logical range to which data accessing is permitted when a user uses that data.

Further, accessing shall be permitted if device-belonging information is included in a possible data arrangement range or typical range information of a storage area, when compared to the possible data arrangement range or the typical range information of the storage area of data to which access is being made.

For example, as shown in FIG. 5, it shall be assumed that there are client computers A and B, the device-belonging information of the client computer A is "Office P", and the device-belonging information of the client computer B is "Department R."

Further, it shall also be assumed that the file E and the file F are available in the file system D in a logical volume I. Also, it shall be assumed that the possible data arrangement range of the file E is "Department R", and the possible data arrangement range of the file F is "Office Q."

Under such circumstances, since, for the client computer A, the device-belonging information is "Office P", and the possible data arrangement range of the file E is "Department R", no accessing is possible to the file E from the client computer A. On the other hand, accessing from the client computer A to the file F is possible since the possible data arrangement range of the File F is "Office P."

In addition, since the typical range information of the file system D will be "Department R", accessing by designating the file system D from the client computer A is not possible.

The typical range information of the logical volume I will also be "Department R." Since the device-belonging information of the client computer B is "Department R", accessing by designating the logical volume I from the client computer B to the entire logical volume I will be possible.

First Embodiment

Hereinafter, a first embodiment according to the present invention will be described with reference to FIGS. 6 through 15.

The first preferred embodiment refers to an example wherein a possible data arrangement range is defined in volume units, and range information of a copy-destination storage area is also defined in volume units.

More specifically, the embodiment refers to a data processing method wherein, at the time of copying data between two volumes that are respectively defined on different storage devices, the range information of a volume in the copy-destination volume is checked as to whether or not it is in the possible data arrangement range of data in the copy-source volume. Only if it exists in the possible arrangement range, copying is executed.

Figure 6:
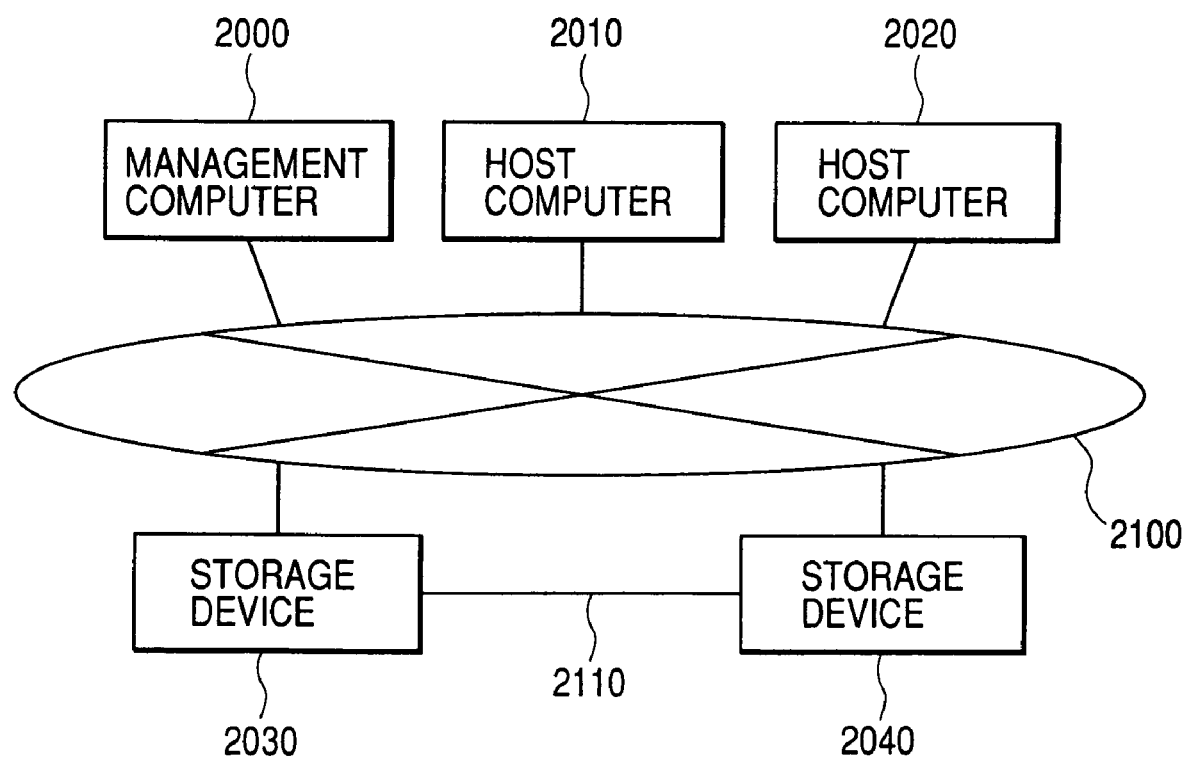
FIG. 6 is a configuration diagram of a computer system according to a first embodiment of the present invention.
Figure 7:
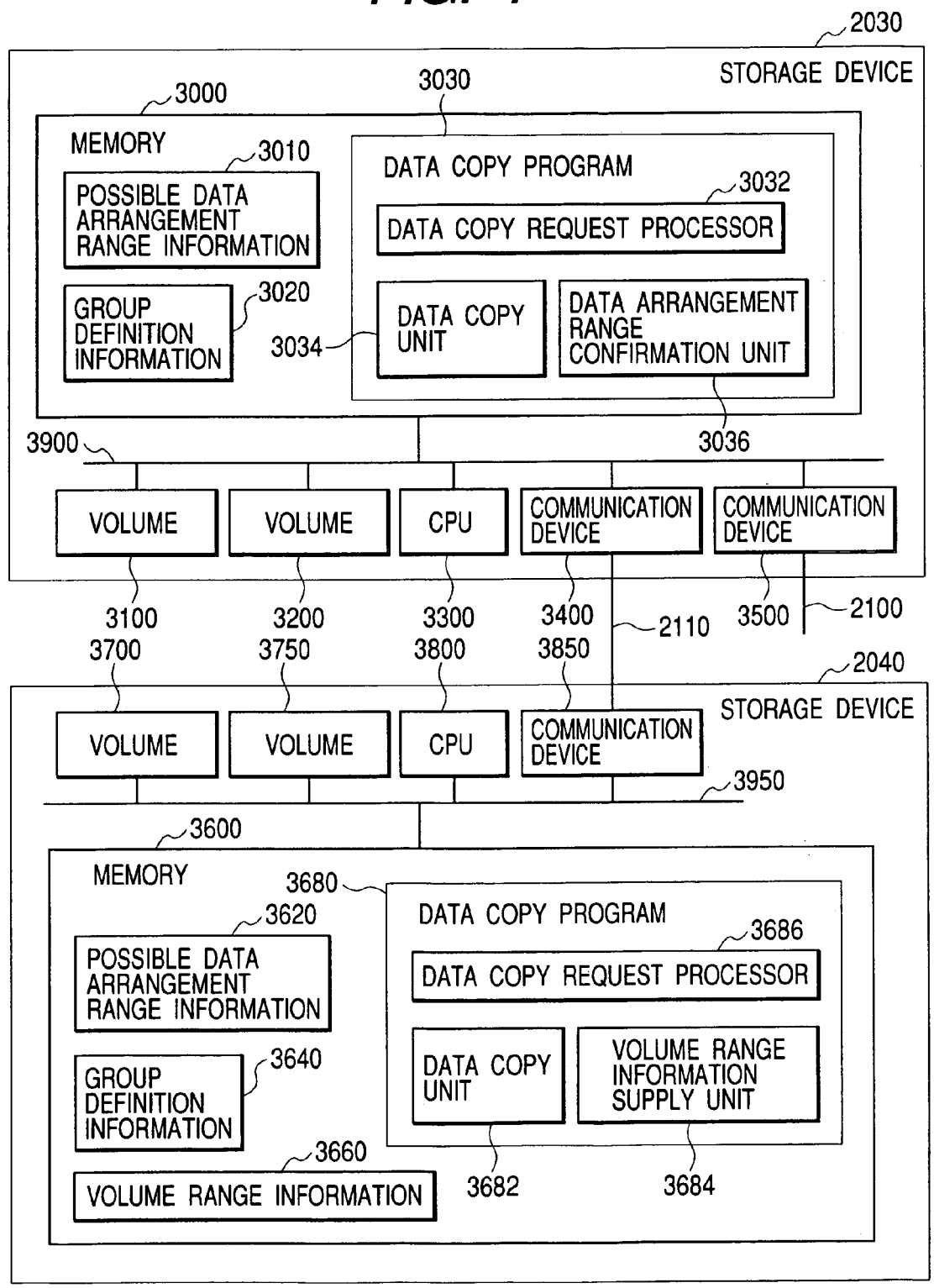
FIG. 7 is an internal configuration diagram of a storage device according to the first embodiment of the present invention.

First, the configuration of a computer system according to the present invention will be described with reference to FIGS. 6 and 7. FIG. 6 is a configuration diagram of a computer system associated with the first embodiment of the present invention. FIG. 7 is an internal configuration diagram of a storage device associated with the first embodiment of the present invention.

With the computer system of the embodiment, a management computer 2000, host computers 2010 and 2020, and storage devices 2030 and 2040 are connected to one another through a network 2100, as shown in FIG. 6. In addition, the storage devices 2030 and 2040 are connected to each other through a storage network 2110. The management computer 2000 controls a volume copying function of the storage devices 2030 and 2040 through the network 2100. And this management computer 2000 can define the possible data arrangement range for data of storage areas and the range information of storage areas in the storage devices 2030 and/ or 2040.

The host computers 2010 and 2020 execute a business application, and each computer uses a volume in a storage device of the storage devices 2030 and/or 2040. These host computers 2010 and 2020 read or write data of storage areas in said storage devices 2030 and/or 2040.

The internal configuration of the storage devices 2030 and 2040 is exemplified in FIG. 7. The storage device 2030 includes volumes 3100, 3200, a CPU 3300, communication devices 3400, 3500, and a memory 3000, which are connected to each other via a communication path 3900. Further, the communication device 3500 is connected to the network 2100, and the communication device 3400 is connected to the storage network 2110.

The memory 3000 includes possible data arrangement range information 3010, group definition information 3020 and a data copy program 3030. The data copy program 3030 includes a data copy request processor 3032, a data copy unit 3034 and a data arrangement range confirmation unit 3036.

Meanwhile, the storage device 2040 includes volumes 3700, 3750, a CPU 3800, a communication device 3850, and a memory 3600, which are connected to each other via a communication path 3950. Further, the communication device 3850 is connected to the storage network 2101. The memory 3600 includes possible data arrangement range information 3620, group definition information 3640, volume range information 3660, and a data copy program 3680. The data copy program 3680 includes a data copy unit 3682, a volume range information supply unit 3684, and a data copy request processor 3686.

The data copy program 3030 is a program that is stored in the volume 3100 or the volume 3200, and the program is loaded into the memory 3000 and is executed by the CPU 3300. Further, the possible data arrangement range information 3010 and the group definition information 3020 are data that is stored in the volume 3100 or the volume 3200, and the data is loaded into the memory 3000 and is used when the data copy program 3030 is executed.

Likewise, the data copy program 3680 is stored in the volume 3700 or the volume 3750, and the program is loaded into the memory 3600 and is executed by the CPU 3800. Further, the possible data arrangement range information 3620, the group definition information 3640 and the volume range information 3660 are data that is stored in the volume 3700 or the volume 3750, and the data is loaded into the memory 3600 and is used when the data copy program 3680 is executed.

Hereinafter, the data structure according to the first embodiment of the present invention will be described with reference to FIGS. 8 through 10. FIG. 8 is a diagram illustrating the possible data arrangement range of data in a volume. FIG. 9 is a diagram illustrating group definition information. FIG. 10 is a diagram illustrating range information of a volume.

The possible data arrangement range information 3010 of the embodiment is defined in volume units, as shown in FIG. 8. This shows that all data in a volume included in a column 4000 has a possible arrangement range of data listed in a column 4010, as a possible data arrangement range.

It may also be possible to state two or more ranges for the possible arrangement range of the column 4010, and the entire range thus stated may be applied.

In addition, with the present embodiment, it is so arranged that a concept of "group" is introduced as an extended concept of the above-stated logical range to enable group designation of the possible data arrangement range as stated in a row 4110.

The group designation information 3020 is typically shown in FIG. 9. Actually, for example as shown in a row 5100, a definition is made in advance, assuming that "Institute A", "Office B" and "Office C" are included for "information group of company A", and "information group of company A" is designated for the possible data arrangement range.

Volume range information to be defined as a copy destination is typically shown in FIG. 10. In the example of the embodiment, range information is defined in such a hierarchical manner that the definition covers from wider range information in "country" units to narrower range information in "project" units.

Here, as shown in FIG. 8, it shall be assumed that data in the volume 3100 is copied to a volume having range information of a volume whose copy destination is shown in FIG. 10.

In this case, since the data in the volume 3100 is "Company A or Company B" in terms of "company" unit, judgment will be made in "company" unit as range information of copy-destination volume. More specifically, as shown in a row 6110, the range information of "Company A" is set for the "company" unit. Consequently, copying will be permitted since the possible data arrangement range of data in the volume 3100 is included in the range information of the copy-destination volume.

Hereinafter, a data processing method according to the first embodiment of the present invention will be described with reference to FIGS. 11 through 15.

Figure 11:
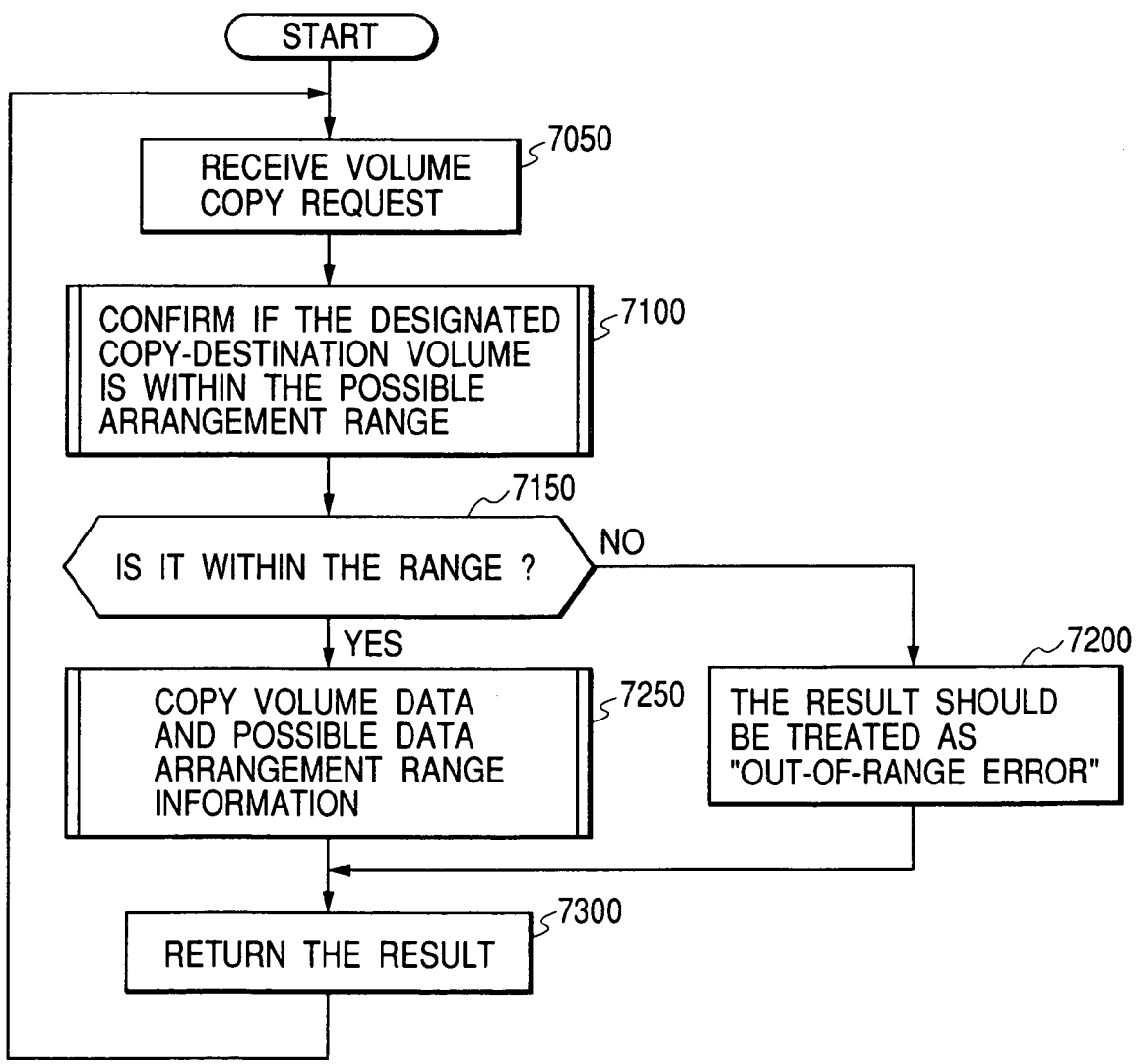
FIG. 11 is a general chart illustrating processing for a case where copying is made under a data processing method according to the first embodiment of the present invention.
Figure 12:
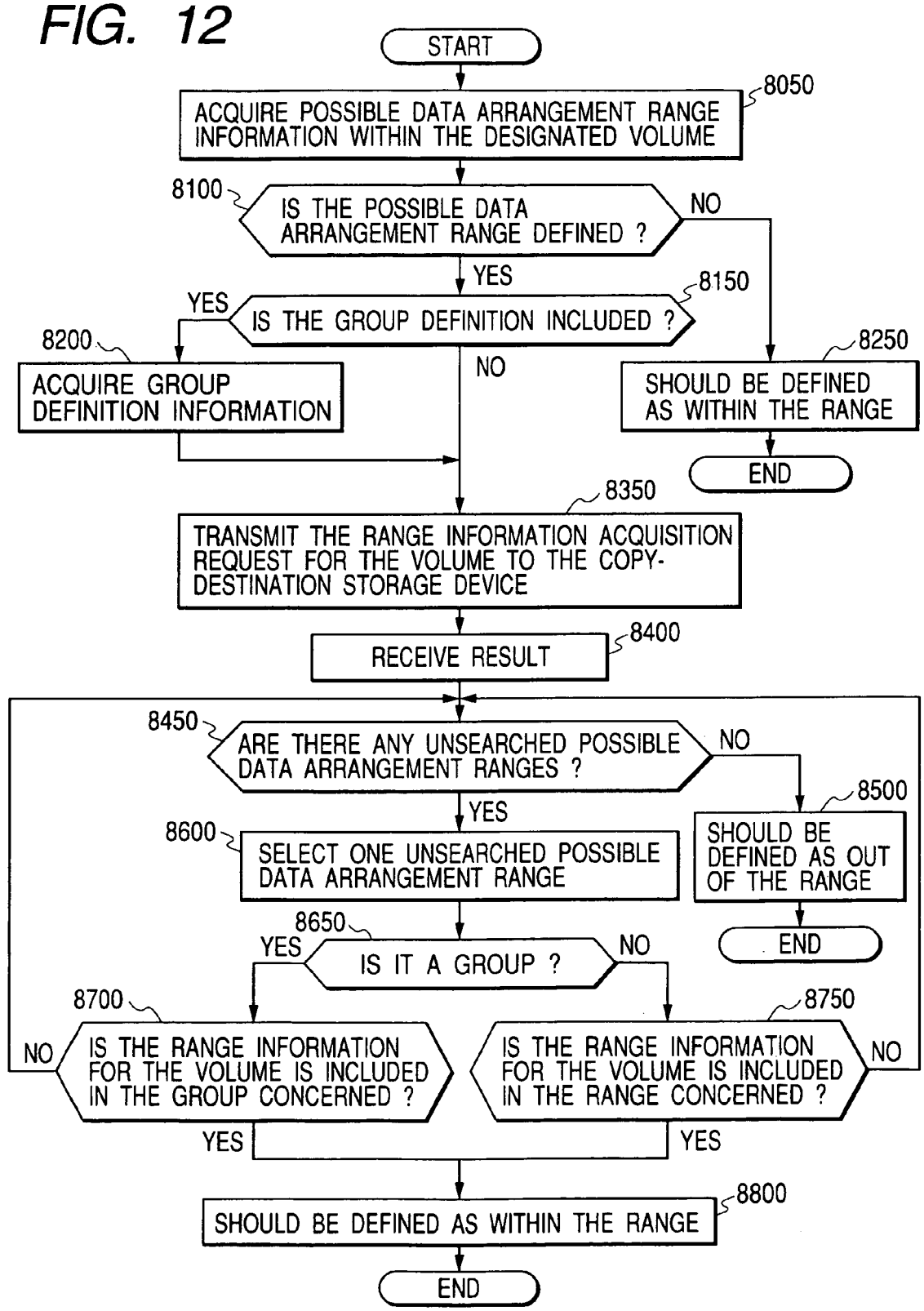
FIG. 12 is a flow chart illustrating processing to examine whether the data of the specified copy-destination volume can be arranged or not.
Figure 13:
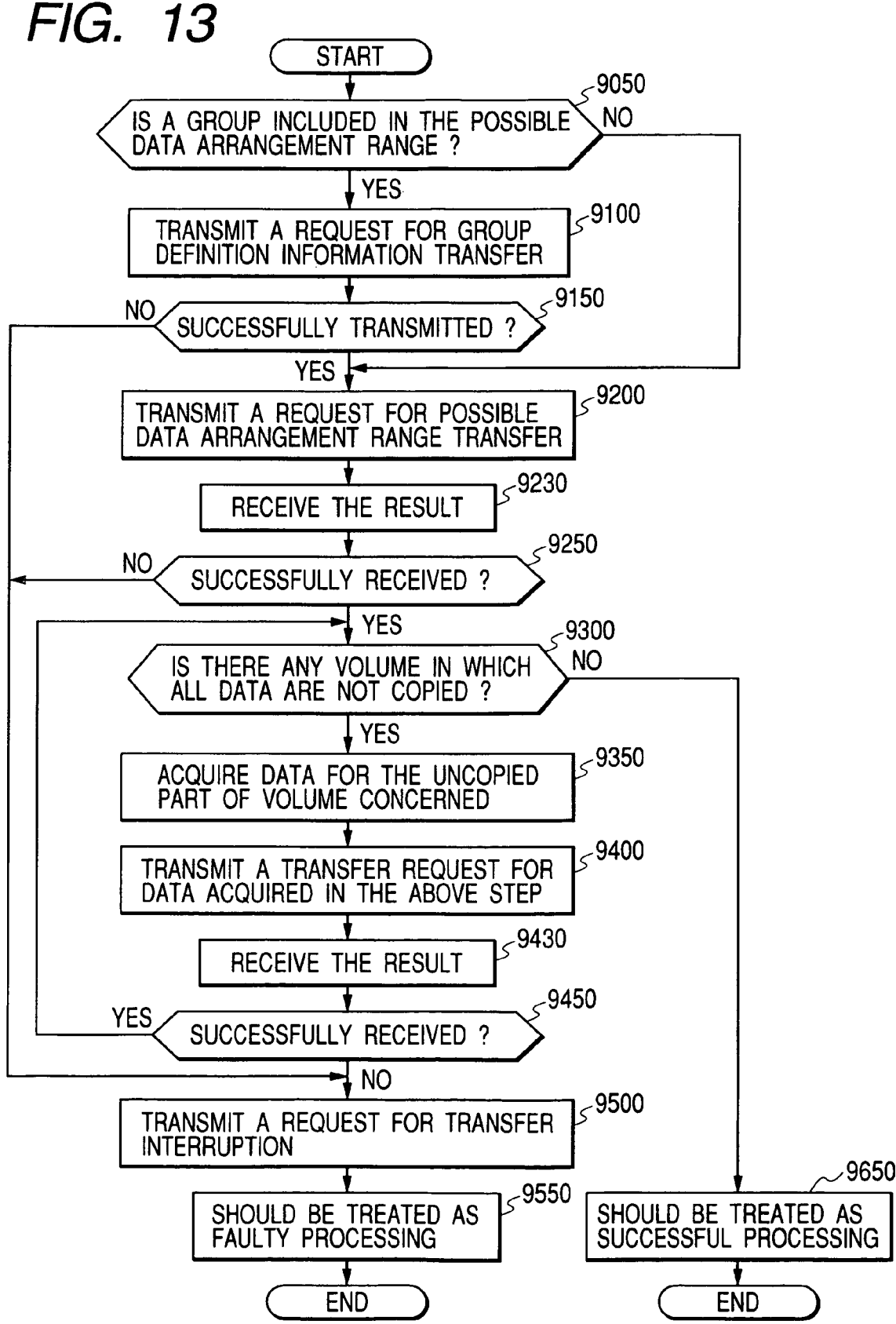
FIG. 13 is a flow chart illustrating processing to copy data and possible data arrangement range information in a volume.

FIG. 11 is a general flow chart illustrating processing for copying by a data processing method according to the first embodiment of the present invention. FIG. 12 is a flow chart illustrating processing to check as to whether or not the data in the specified copy-destination volume can be arranged. FIG. 13 is a flow chart illustrating processing to copy data and possible data arrangement range information in a volume.

Figure 14:
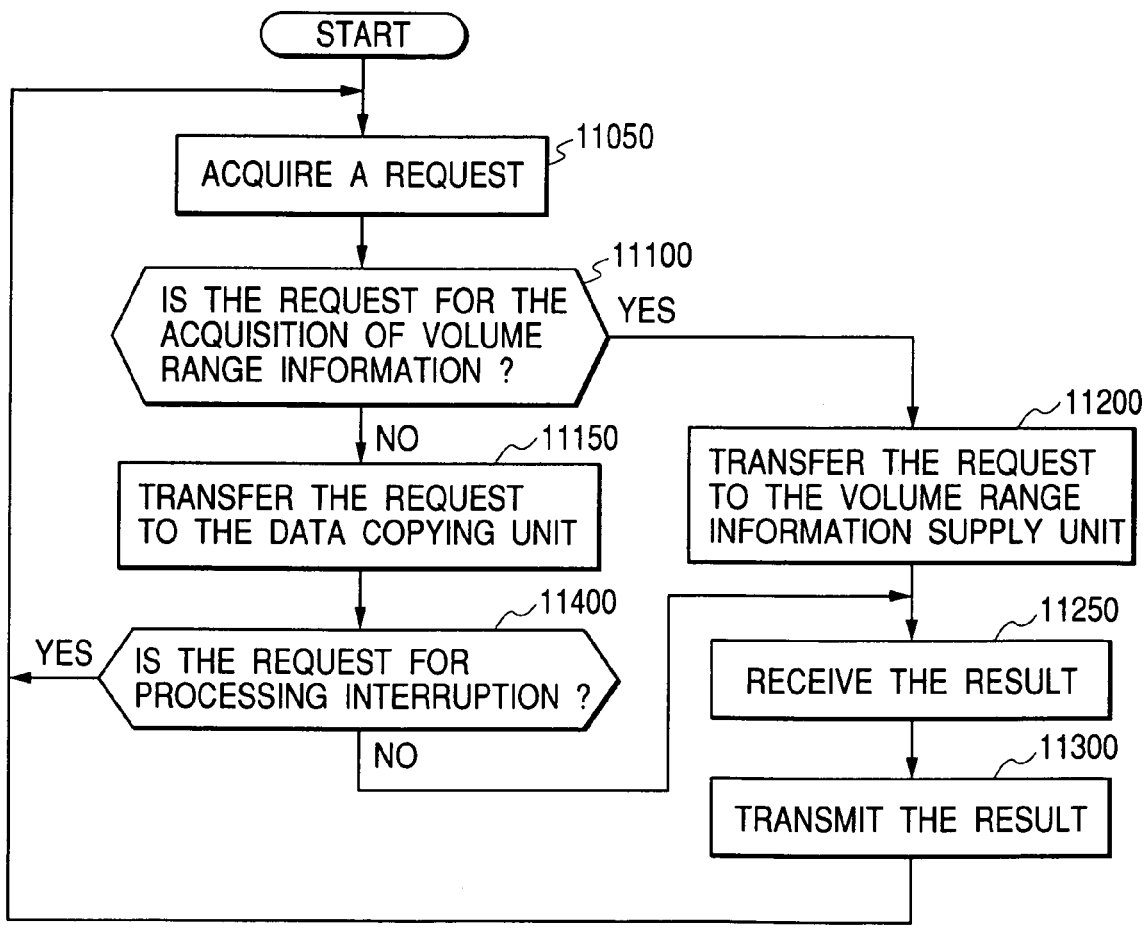
FIG. 14 is a flow chart illustrating processing in a data copy request unit.
Figure 15:
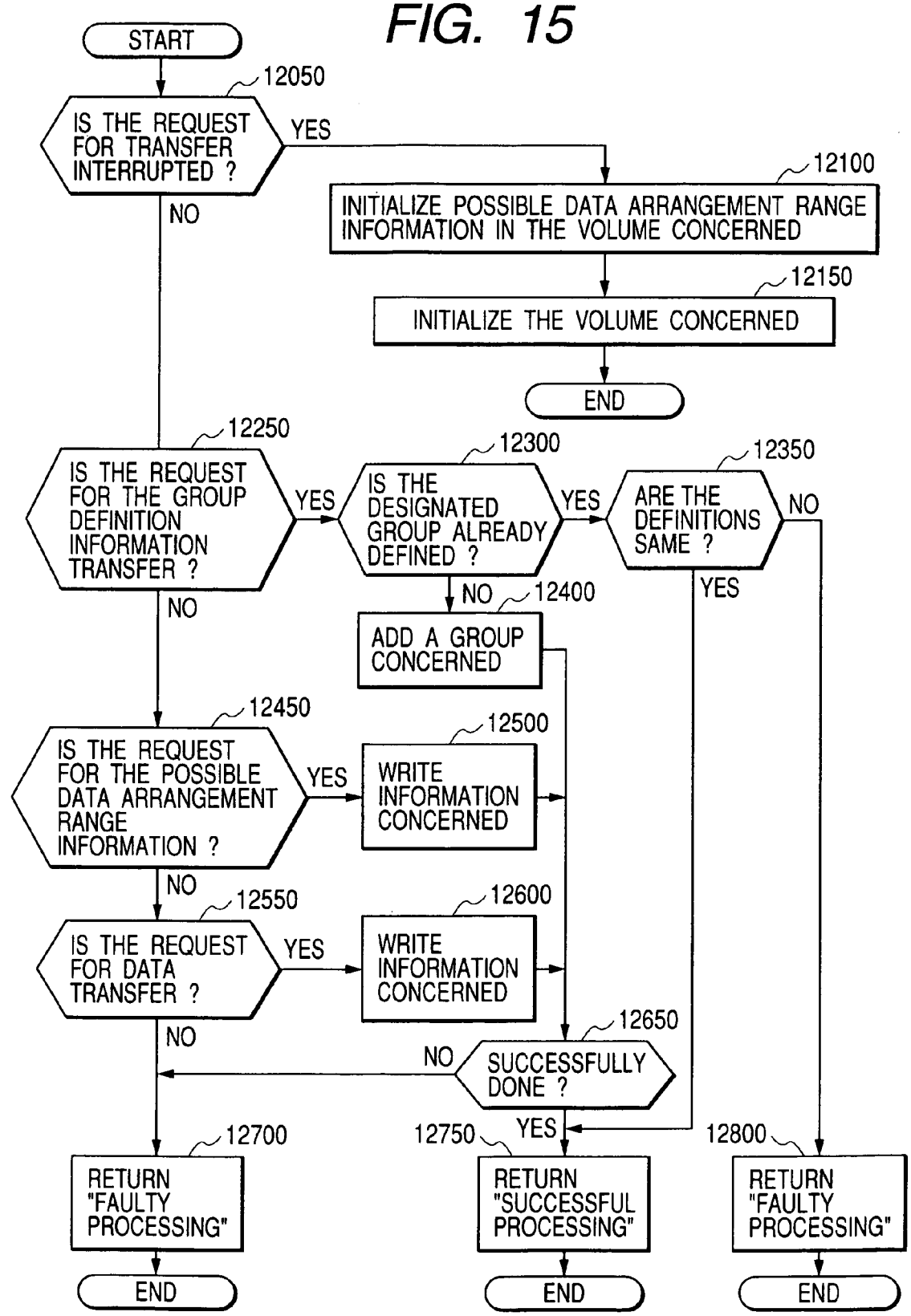
FIG. 15 is a flow chart illustrating processing in a data copy unit.

FIG. 14 is a flow chart showing processing in a data copy request unit. FIG. 15 is a flow chart showing processing in a data copy unit.

In the data processing method according to the embodiment, first, as shown in FIG. 11, waiting for receiving a data copy request is executed upon initiation of processing (step 7050). The data copy request is delivered from the management computer 2000 in FIG. 6 via the network 2100. Then, the range information defined in the copy-destination volume requested, or the range information 3660 of the volume defined in FIG. 11 is checked as to whether or not it is in the possible arrangement range of data in the copy-source volume (step 7100). If the information is beyond the range (step 7150), then, the result is defined as "out-of-range error" (step 7200). Otherwise, if the judgment result in step 7100 is within the range (step 7150), the data in the volume and the possible data arrangement range information are copied in accordance with the above-stated request (step 7250).

For example, when the range information defined in the copy-destination volume is the one shown in FIG. 10, and if the data in the volume 3100 in FIG. 8 is being copied, copying is executed as "within the range", since the possible arrangement range of data in the copy-source volume is "Company A" and the range information in company unit of the copy-destination volume is "Company A."

Then, the result of step 7250 or 7200 is returned back to the management computer 2000, which is the requestor of the above-stated request (step 7300).

Hereinafter, processing in step 7100 will be described in detail with reference to FIG. 12.

The process is the one that is executed by the data arrangement range confirmation unit 3036 shown in FIG. 7.

First, requested possible arrangement range information of data in a volume is acquired from the possible data arrangement range information 3010 (step 8050).

Then, a judgment is made, as a result of such acquisition, as to whether or not the possible arrangement range of the copy-source volume has been defined (step 8100). If the range has not been defined, the process is terminated after designating as "within the possible arrangement range" (step 8250). This means copying can be done without problem unless a possible arrangement range is designated. However, if the above-stated possible arrangement range has not been defined, it may be so arranged that judgment should always be made as "out of the possible arrangement range."

Conversely, in step 8100, if it is judged that the possible arrangement range has been defined, a judgment is made as to whether or not a group definition is included in the possible arrangement range (step 8150). If the definition is included, the group definition information 3020 is acquired (step 8200). It should be noted that it is not always necessary to acquire all of the group definition information 3020, but only information of a group that is required for making a copy request can be acquired.

Next, in step 8350, a volume range information acquisition request is sent to the storage device 2040 to which the copy-destination volume is defined (step 8350), and the result is received (step 8400).

The volume range information supply unit 3684 of the copy-destination volume in the copy program 3680, upon receiving the volume range information acquisition request, receives a value of the volume range information acquisition request, and returns the result.

Next, referring to the range information of the volume received, the data arrangement range confirmation unit 3036 judges whether or not there is any range on which examination regarding if it is within the possible arrangement range or not has not been executed among the possible arrangement range information acquired in step 8050 (step 8450). If there is no such range, the unit terminates the processing, judging that the designated copy-destination volume is out of the possible arrangement range of the data in the copy-source volume (step 8500).

In step 8450, if there are ranges that have not been searched as to whether or not it is in the possible arrangement range, one of such ranges is selected (step 8600). Then, the unit 3036 judges whether or not the range thus selected is a group (step 8650). If it is a group, the unit 3036 judges, by using the information acquired in step 8200, whether or not the range information of the volume received in step 8400 is included in the range defined by the group (step 8700). On the other hand, in step 8650, if it is judged that the range is not a group, the unit 3036 judges whether or not the range information of the volume acquired in step 8600 is included in the range acquired in step 8400 (step 8750). If, in steps 8700 and 8750, it is judged that the range is not in the possible data arrangement range, the processing is then continued starting from step 8450. However, if it is judged to be within the range, the unit 3036 terminates the processing, judging that the processing result is within the range (step 8800).

Hereinafter, processing to copy data and the possible data arrangement range information in a volume will be described with reference to FIG. 13.

The processing is the one that is executed by the data copy unit 3034 shown in FIG. 7.

First, the data copy unit 3034 checks whether or not a group is included in the possible data arrangement range (step 9050). If a group is included, information in the group definition information 3020 concerning groups is transferred to the storage device 2040 by using the communication device 3400 (step 9100). If the transfer is successful, the processing is resumed at step 9200. Otherwise, if the transfer is failed, the processing is resumed at step 9500 (step 9150).

The reason for the above is that, if a group is included in a possible data arrangement range, the information needs to be taken up by the copy destination.

Further, in step 9050, if it is judged that a group is not included, the processing is resumed at step 9200. In step 9200, a possible data arrangement range transfer request of data to be transferred is transmitted to the storage device 2040 (step 9200), and the result of the request is received from the storage device 2040 (step 9230). If the result is successful, the processing is resumed at step 9300, or from step 9500 if the result is failure (step 9250).

In step 9300, a check is made whether or not there is a volume from which all data have not been transferred to the storage device 2040 (step 9300). If there is no such volume, assuming that copying of all data is successful (step 9650), the processing is terminated. In the step 9300, if there is a volume from which all data have not been transferred to the storage device 2040, part of or all data that have not been transferred yet is selected (step 9400), and a transfer request of such selected data is transmitted to the communication device 3400 (step 9400). Thereafter, the result of the above-stated request is received (step 9430), a judgment is made whether or not the transfer is successful (step 9450). If the transfer is successful, the processing is resumed at step 9300. In step 9450, if it is judged that processing is failed, a transfer interruption request is transmitted to the storage device 2040 (step 9500), assuming that the processing is failed (step 9550), the processing is terminated.

Hereinafter, processing of the data copy request processor 3686 will be described with reference to FIG. 14.

In the data copy request processor 3686, a processing request from the communication device 3400 is acquired from the communication device 3850 (step 11050). At this time, if the processing request is not delivered, the processor 3686 will wait for the request until it is delivered. Thereafter, the processing request acquired in the above is judged whether or not it is a volume range information acquisition request (step 11100). If the request is the volume range information acquisition request, then, in step 11200, the processing request is transferred to the volume range information supply unit 3684. Otherwise, the above-stated request is transferred to the data copy unit 3682 in step 11150. In steps following the step 11150, a judgment is made whether or not the request is a processing interruption request (step 11400). If it is the processing interruption request, the processing is resumed at step 11050. Otherwise, the processing is resumed at step 11250. After transmitting the request to the volume range information supply unit in step 11250, the processing is resumed at step 11250.

Thereafter, the result is received from the transfer source of the request (step 11250), the result is transmitted to the communication device 3400 via the communication device 3850 (step 11300), and the processing is resumed at step 11050.

Hereinafter, the processing of the data copy unit 3682 will be described with reference to FIG. 15.

The data copy unit 3682 is included, as shown in FIG. 7, in a copy program of the storage device 2040 in the copy-destination volume.

In the processing of the data copy unit 3682, a judgment is made whether or not the received request is a transfer interruption request (step 12050). If it is the transfer interruption request, the possible data arrangement range information in the volume designated in step 12100 is initialized (step 12100). Then, the above-stated volume is initialized (step 12150) and the processing is terminated. The reason for this initialization is not to leave any in-process data in the volume.

On the other hand, if it is judged, in step 12050, that the request is not a transfer interruption request, a judgment is made, in step 12250, whether or not the request is a group definition information transfer request. If it is the group definition information transfer request, a check is made, in step 12300, whether the designated group has been defined in the group definition information 3640. If the designated group has not been defined in the group definition information 3640, then, in step 12400, the group is added to the group definition information 3640, and the processing is resumed at step 12650. In step 12300, if it is judged that the designated group has not been defined, then, a judgment is made, in step 12350, whether or not the definition is the same as that of the group that has been already defined. If so, a return value indicating successful processing is transmitted to the data copy request processor 3686 (step 12750), and the processing is terminated.

If it is judged, in step 12350, that the definitions are not the same, then, in step 12800, a return value indicating processing failure is transmitted to the data copy request processor 3686, and the processing is terminated. It should be noted, here, that the group definition information shall be consistent and any changes thereof shall not be permitted during the processing, and if any inconsistency is available, the information is handled as an error.

On the other hand, in step 12250, if the received request is not a group definition information transfer request, a judgment is made whether or not the acquired request is a transfer request of possible data arrangement range information (step 12450). If the request is a transfer request of possible data arrangement range information, then the possible data arrangement range information that has been transferred along with the request is written on the possible data arrangement range information of a volume in the possible data arrangement range information 3620 (step 12500), and the processing is resumed at the step 12650.

The reason for the above is that the possible data arrangement range information needs to be taken up by the copy-destination volume.

In step 12450, if the request is judged not to be a transfer request of possible data arrangement range information, a judgment is made whether or not the request is a data transfer request (step 12550). If it is a data transfer request, then, the data designated in the above-stated request is written in a designated position of the volume 3700 or the volume 3750 (step 12600), and the processing is resumed at step 12650.

If the processing is successful in step 12650, the processing is resumed at step 12750. If the processing is failed in step 12650, the processing is resumed at step 12700. In step 12750, a return value indicating successful processing is transmitted back to the data copy request processor 3686, and the processing is terminated. In step 12700, a return value indicating failed processing is transmitted back to the data copy request processor 3686, and the processing is terminated.

The possible data arrangement range information 3010 and 3620, the group definition information 3020 and 3640, the volume range information 3660, the data copy request processors 3032 and 3686, the data arrangement range confirmation unit 3036, the volume range information supply unit 3684, and the data copy programs 3030 and 3680 shown in FIG. 7 are not always have to be located in a storage device as shown in FIG. 7, but they may be located in the management computer 2000, or any other device that is connected to the host computer 2010, the host computer 2020 or the network 2100.

Further, the data copy programs 3030 and 3680 may be mounted not in the form of software, but in the form of hardware. Furthermore, the data copy programs 3030 and 3680, the possible data arrangement range information 3010 and 3620, the group definition information 3020 and 3640, and the volume range information 3660 may be stored in a storage device that is directly connected to any one of the management computer 2000, and the host computers 2010, 2020.

With the first embodiment, although the example is described wherein a range is grouped, designation of possible data arrangement range in group unit is enabled, and group definition information is transferred at the time of transferring data or the possible data arrangement range, the group definition information may not always be transferred. In this case, if such group is not defined in the storage device to which data is copied, the transfer processing is only needed to abort as abnormality occurs. In addition, designation in group unit may not be always required.

Furthermore, in the flow of processing shown in FIG. 15, initialization of the volumes and the possible data arrangement range information in steps 12100 and 12150 can be omitted. Alternatively, only the written data may be initialized, or no arrangement may be taken for this purpose.

Second Embodiment

Hereinafter, a second embodiment according to the present invention will be described with reference to FIGS. 16 through 22.

The first embodiment has been referred to an example wherein range information is defined for a volume, and a check is made whether or not copying can be made by defining a possible data arrangement range for data located within the volume.

The second preferred embodiment refers to an example wherein a copy-source storage device has a storage area configured with a logical volume, a file system and a file, and data is copied in a storage area in which range information is designated to a logical volume of the copy-destination storage device.

The entire computer system is configured to include a host computer 2010, a storage device 2030 and a storage device 2040, which are connected to a network 2100, as is the case with the first preferred embodiment.

Figure 16:
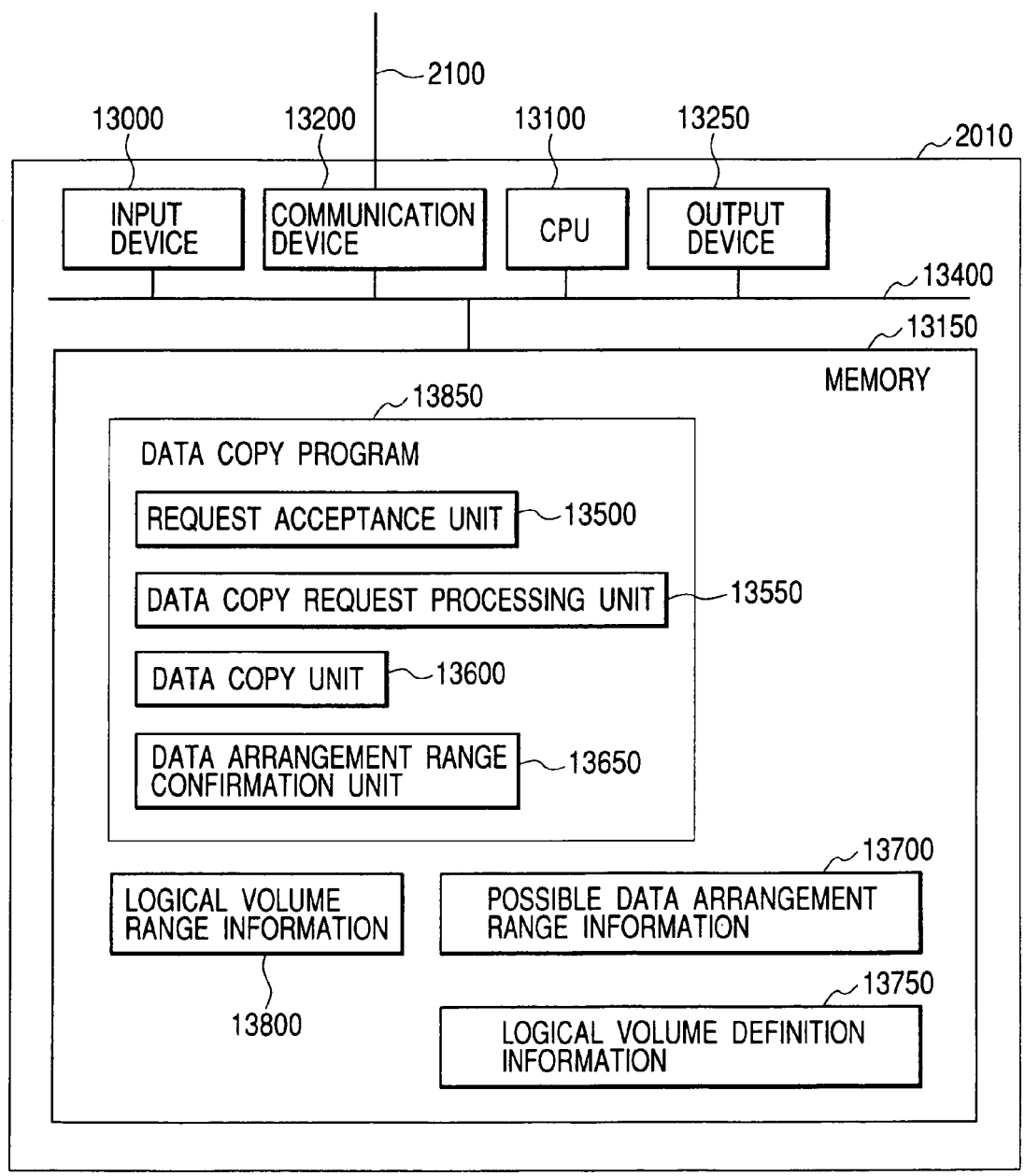
FIG. 16 is an internal configuration diagram of a host computer according to a second embodiment of the present invention.
Figure 17:
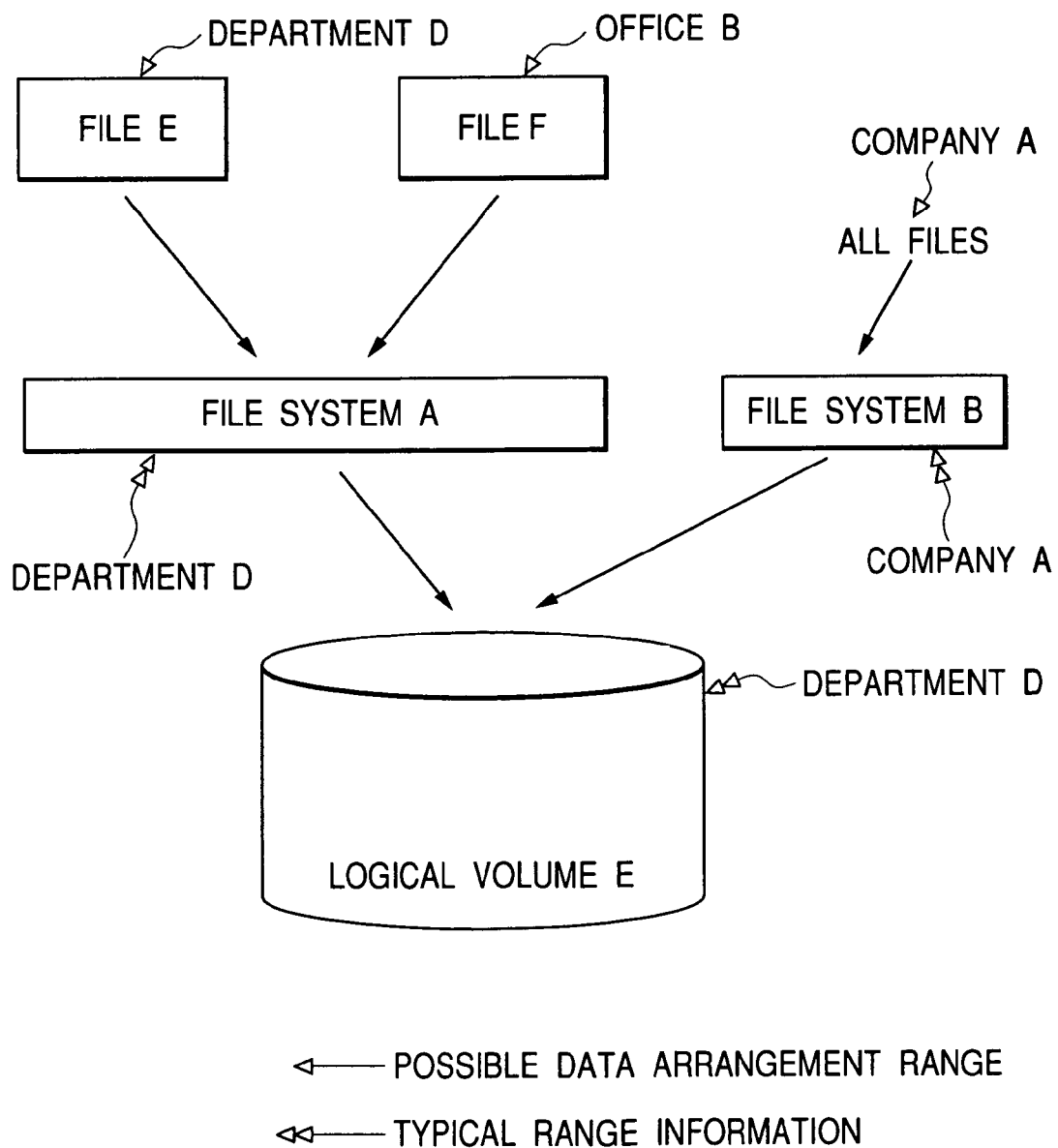
FIG. 17 is a diagram showing a configuration of copy-source storage area.

FIG. 16 is an internal configuration diagram of a host computer associated with a second embodiment of the present invention. FIG. 17 is a diagram showing a configuration of copy-source storage area. FIG. 18 is a diagram showing logical volume definition information. FIG. 19 is a diagram showing file system configuration information. FIG. 20 is a diagram showing range information of a logical volume.

In the second embodiment, a data copy program runs on the host computer 2010, and information associated with a mutual hierarchy of storage areas is also stored in the host computer 2010.

The host computer 2010 is provided with an input device 13000, a communication device 13200, a CPU 13100, an output device 13250, and a memory 13150, which are connected to one another over a communication path 13400. Further, the communication device 13200 is connected to another network via the network 2100. The memory 13150 includes a data copy program 13850, possible data arrangement range information 13700, logical volume definition information 13750, file system configuration information 13760 and logical volume range information 13800. The data copy program 13850 includes a request acceptance unit 13500, a data copy request processor 13550, a data copy unit 13600 and a data arrangement range confirmation unit 13650.

The data copy program 13850 is stored in the storage device 2030 or the storage device 2040 that is connected to the network 2100, read by the memory 13150 according to a request from the input device 13000, and then executed by the CPU 13100.

The logical volume range information 13800, the possible data arrangement range information 13700 and the logical volume definition information 13750 are stored in the storage device 2030 or the storage device 2040 that is connected to the network 2100, read in the memory 13150 as required, and used at the time of executing processing of the data copy program 13850.

The logical volume definition information 13150 is information indicating how a logical volume is configured by using which volume of which storage device.

The file system configuration information 13760 is information indicating how a file system is arranged in a logical volume.

The logical volume range information 13800 refers to a range that permits arrangement of data to be stored in each logical volume.

The request acceptance unit 13500 receives a request from the input device 13000, delivers a request for a copy to the data copy request processor 13550, receives a request processing result from the data copy request processor 13550, and outputs the result to the output device 13250.

The data copy request processor 13550 issues a request to the data arrangement range confirmation unit 13650 to check whether or not the position of the copy-destination logical volume is in the possible data arrangement range of the copy-source logical volume. If it is judged that the request processing result is within the range, the processor 13550 initiates copying of the data and the possible data arrangement range information between the logical volumes in the data copy unit 13600 according to the request. Otherwise, if the request processing result is but of the range, the processor 13550 returns an error indicating the result is out of the range to the request acceptance unit 13500.

In this embodiment, a logical range is assumedly the same as that of FIG. 2, and a copy-source storage area is of a configuration shown in FIG. 17.

More specifically, the logical volume F shall include the file system A and the file system B, and further the file system A shall incorporate the file E and the file F. Further, the possible data arrangement range of the file E shall be "Department D", and that of the file F shall be "Office B." In addition, the possible data arrangement range of all files that are included in the file system B shall be "Company A."

The logical volume definition information 13150 shall be supposed to be the cross-referencing combinations with volumes as shown in FIG. 18.

Further, the file system configuration information 13760 shall be arranged on the logical volume as shown in FIG. 19.

Furthermore, it shall be supposed that the range information 13800 of the logical volume is defined to have a range that allows for arrangement of data to be stored in respective logical volume, as shown in FIG. 20.

Under such circumstances, a case is assumed where data in the logical volume E is copied to the logical volume F, the logical volume G and the logical volume H.

First, it shall be supposed that the file system A is designated as a storage area, and the data is copied to the volume F.

In this case, typical range information of the file system A will be calculated. Since the file E and the file F are included in the file system A, and the possible data arrangement ranges of the files are "Department D" and "Office B", respectively, the typical range information of the file system A should be the narrower, i.e., "Department D."

As shown in FIG. 18, since the range information of the logical volume F is "Office B", the range information of the logical volume F is not in the typical range information, "Department D," of the file system A, and thus the copying will not be permitted.

Next, it shall be supposed that the logical volume E is designated as a storage area, and its data is copied to the logical volume G.

In this case, typical range information of the logical volume E will be calculated. The logical volume E is configured, as shown in FIGS. 17 and 19, with the file system A and the file system B, the typical range information of the file system A is "Department D", and the typical range information of the file system B is "Company A." Therefore, the typical range information of the logical volume E should be the narrower, i.e., "Department D."

As shown in FIG. 18, the range information of the logical volume G is also "Office B", the range information of the logical volume F is not in the typical range information "Department D" of the logical volume G, and thus the copying will not be permitted.

When the logical volume E is designated as a storage area, and its data is copied to the logical volume H, the range information of the logical volume H is "Department D" as shown in FIG. 18, the range information of the logical volume H is in the typical range information "Department D" of the logical volume G, and thus the copying will be permitted. Here, when the range information and the typical range information coincide with each other, it is understood that the range information should be located within the typical range information, as a matter of course.

Figure 21:
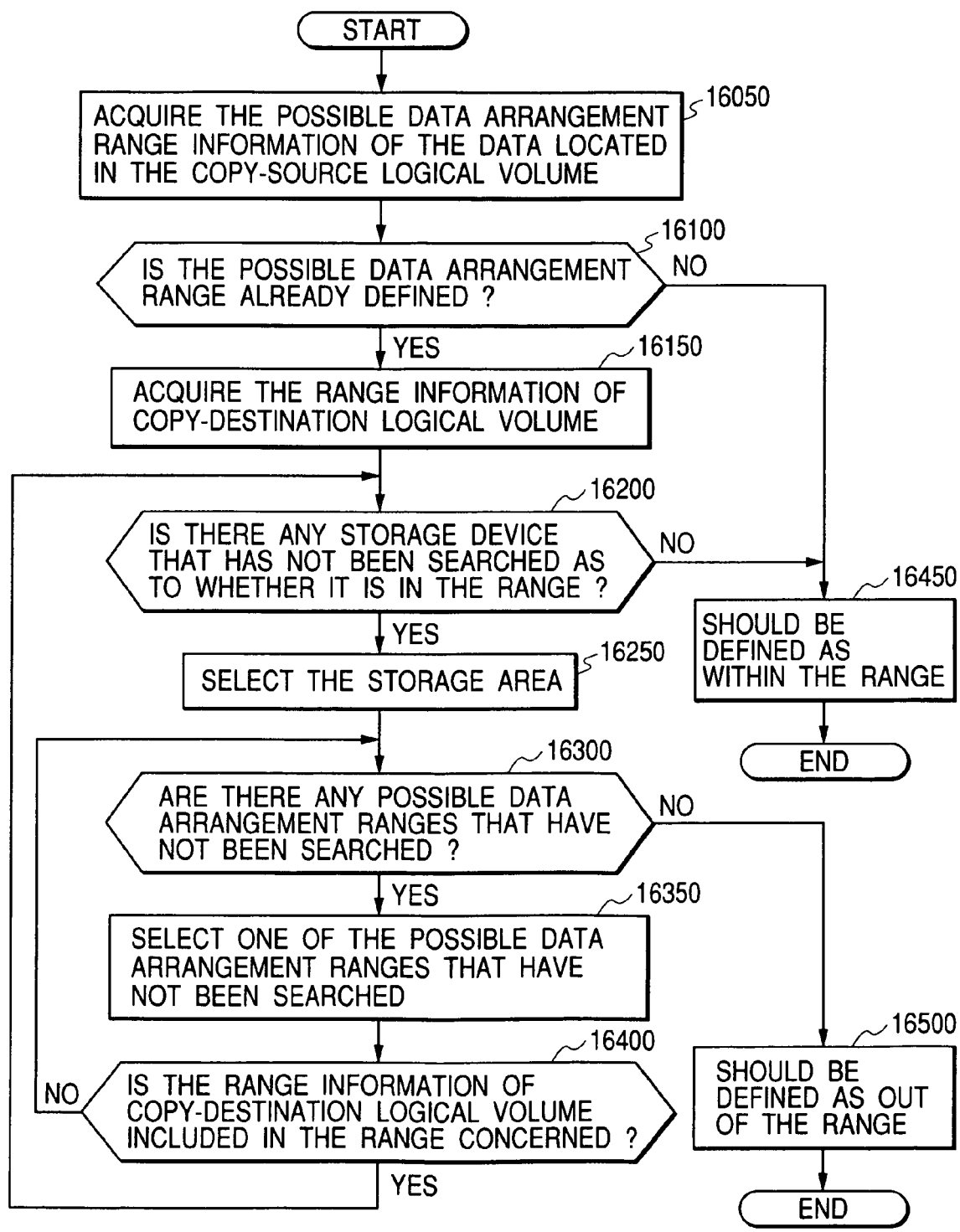
FIG. 21 is a flow chart illustrating processing of the data arrangement range confirmation unit.

Hereinafter, processing of the data arrangement range confirmation unit 13650 will be described with reference to FIG. 21.

First, possible arrangement range information of data located in a copy-source logical volume is acquired from the possible data arrangement range 13700 (step 16050).

In this case, when a storage area has been designated, the typical range information of the storage area will be obtained. The method for obtaining the typical range information will be described in detail later.

Thereafter, if the possible data arrangement range information acquired has been defined (step 16100), then, the range information of the copy-destination logical volume is acquired (step 16150).

On the other hand, in step 16100, if the possible data arrangement range acquired in step 16050 has not been defined, the copy-destination logical volume should be considered to be in the range which allows for copying data in the copy-source logical volume (step 16550), and the processing is terminated.

In the processing following step 16150, a judgment will be made as to whether or not there is any storage device, among storage devices acquired in step 16050, to which processing following step 16250 has not been applied (step 16200). If such device is not available, the processing will be resumed at step 16450. In step 16200, if a storage device to which processing following the step 16250 has not been applied is found, one of the above-stated storage devices is selected (step 16250).

Next, a check for the storage device selected in step 16250 is made as to whether or not there is any range, in the range of the step 16050, to which processing following step 16350 has not been applied (step 16300). If such range is not available, the situation is determined to be "out of range" (step 16500), and the processing is terminated. In step 16250, if a judgment is made that there is a range to which processing following step 16350 has not bee applied, one of the possible data arrangement ranges to which processing following step 16500 has not been applied is selected (step 16350).

Thereafter, a judgment is made as to whether or not the range information of the copy-destination logical volume that is selected in the foregoing step 16250 is included in the selected range (step 16400). If it is judged that the information is not included, the processing is resumed at step 16300. Otherwise, it is judged that the information is included, the processing is resumed at step 16200.

In the second embodiment, it is so arranged that the data copy program 13850, the logical volume range information 13800, the possible data arrangement range information 13700, the logical volume definition information 13750 and the file system configuration information 13760 are stored in the storage device 2030 or the storage device 2040 that is connected to the network 2100. However, they may be stored in a storage device that are incorporated in or directly connected to the host computer 2010, or in any storage device connected to the network 2100.

Hereinafter, processing for obtaining typical range information will be described with reference to FIG. 22.

Figures 22, 23:
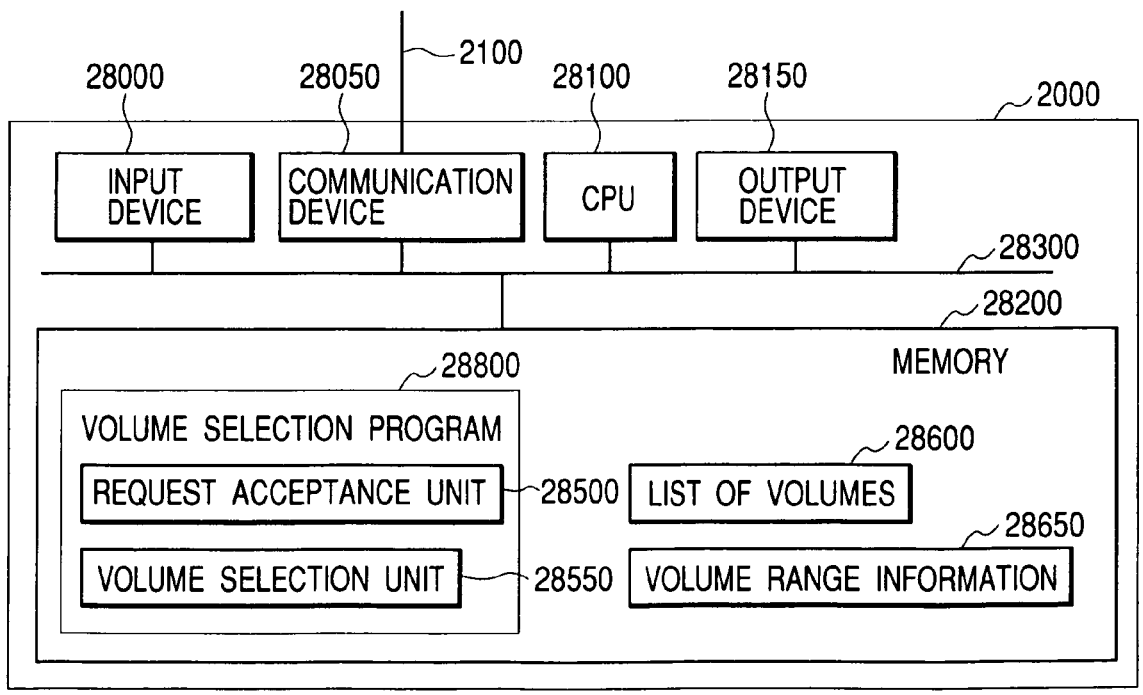
FIG. 22 a diagram showing an example of typical range information in the second embodiment of the present invention.
FIG. 23 is a diagram showing an internal configuration of a management computer according to a third embodiment of the present invention.

FIG. 22 is a diagram showing an example of typical range information in the second embodiment of the present invention.

As shown in FIG. 22, the memory hierarchy of the second embodiment is shown in a column 24000, and more specifically, the hierarchy is configured as shown in a column 24040.

Further, in the column 24040, a possible data arrangement range and typical range information associated with respective data or storage areas are shown.

Here, it should be kept in mind that the typical range information of the nth (n≧2) memory hierarchy will be the narrower logical range of the typical range information of the (n−1)th column.

Here, for example, it shall be supposed that the typical range information of the file system A is obtained. At this time, if the typical range information of the file system A has already been obtained and the information has been saved, such information may be used.

On the other hand, if the typical range information of the file system A has not been obtained yet, a check will be implemented to an upper storage hierarchy that configures the information. Since the file system A includes the file E and the file F, a check will be made for the possible data arrangement range of these files, and the logical range having the narrowest range may be determined to be the typical range information of the file system A. In this case, however, since the possible data arrangement range of the file E is "Department D" and that of the file F is "Office B", the typical range information of the file system A should be the narrower range or "Department D."

As described in the above, typical range information of a certain storage area can be obtained, by examining storage areas in the upper hierarchy, and taking up the typical range information of a storage area in the upper hierarchy, or the narrower possible data arrangement range of the data.

Third Embodiment

Hereinafter, a third embodiment according to the present invention will be described with reference to FIGS. 23 through 27.

The third preferred embodiment refers to a method for managing a storage area which searches for a volume that can be copied or moved, by designating a certain volume and by considering a possible data arrangement range and data capacity of data located in such volume.

Figure 27:
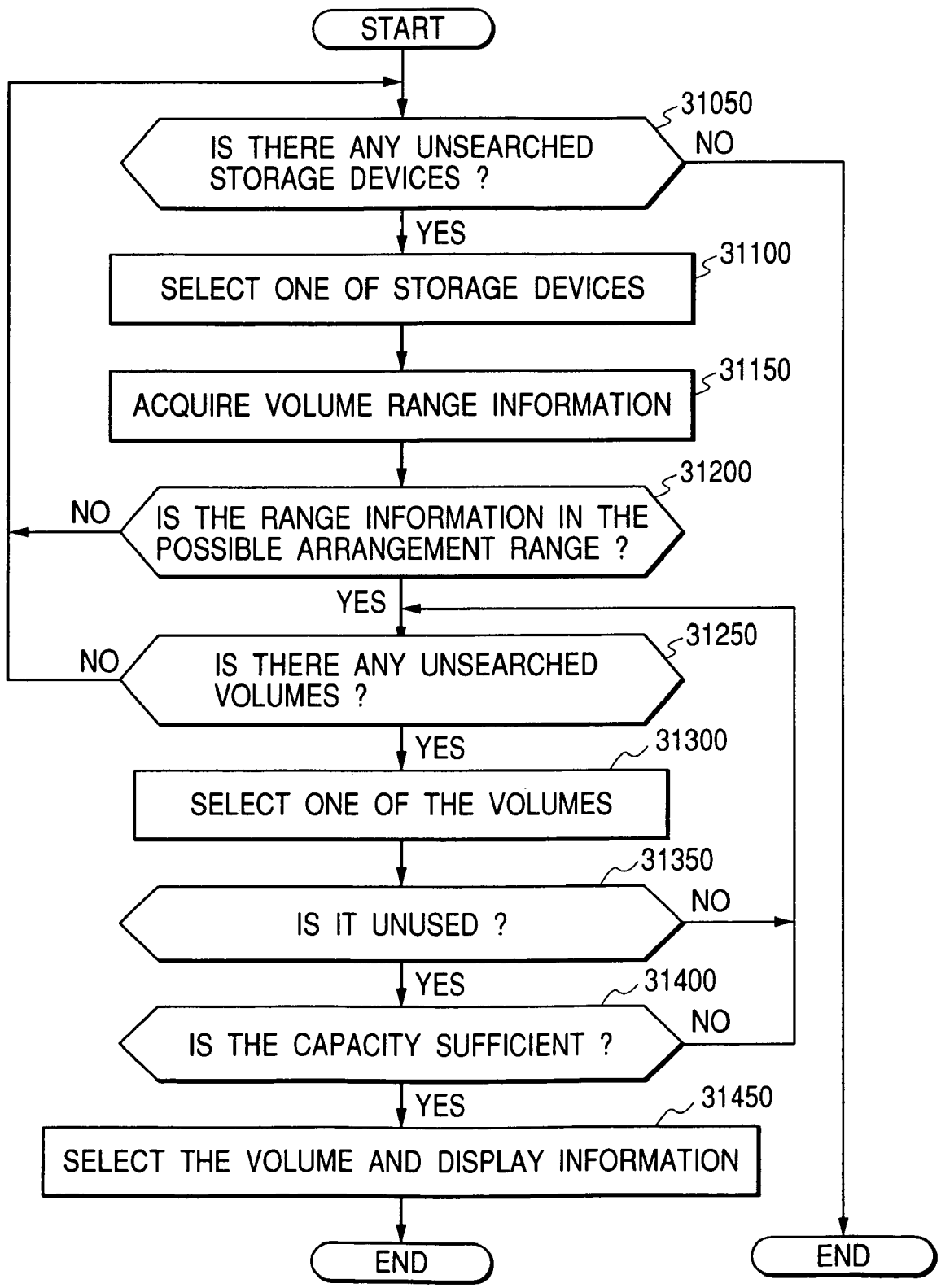
FIG. 27 is a flow chart illustrating processing in a volume selection unit.

FIG. 23 is a diagram showing an internal configuration of a management computer according to the third embodiment of the present invention. FIG. 24 is a diagram showing a possible data arrangement range according to the third embodiment of the present invention. FIG. 25 is a diagram showing a volume information list. FIG. 26 is a diagram showing range information of volumes. FIG. 27 is a flow chart illustrating processing in a volume selection unit.

The present embodiment has a configuration similar to that of the first embodiment shown in FIG. 6, and a program to select a volume is implemented by a management computer 2000.

The management computer 2000, as shown in FIG. 23, includes an input device 28000, a communication device 28050, a CPU 28100, an output device 28150, and a memory 28200, which are connected to one another over a communication path 28300.

The communication device 28050 is connected to the network 2100. In addition, the memory 28200 includes a volume selection program 28800, possible data arrangement range information 28610, a volume list 28600, and volume range information 28650. Further, the volume selection program 28800 includes a request acceptance unit 28500 and a volume selection unit 28550. The volume selection program 28800 is a program that is stored in the storage device 2030 or the storage device 2040 that is connected to the network 2100, read into the memory 28200, and executed by the CPU 28100.

The volume list information 28600 and the volume range information 28650 are data that is stored in the storage device 2030 or the storage device 2040 that is connected to the network 2100, and is used at the time of executing the volume selection program 28000.

The request acceptance unit 28500 accepts a volume assignment request from the input device 28000, and delivers the request to the volume selection unit 28550. Then, the unit 28500 receives a processing result of the volume selection unit 28550, and outputs the result to the output device 28150.

The possible data arrangement range information 28610 of the present embodiment is shown according to volumes as shown in FIG. 24. For example, the possible data arrangement range of all data in the volume A is "Office B."

The list of volumes information 28600 consists of information as to which storage device a volume belongs, and the status and free space of the volume, as shown in FIG. 25.

For example, FIG. 25 shows "Volume A" belongs to "Storage Device 2030", the status is "In use", and the free space is "8124" MB.

It should be noted that, here, data shall newly not be copied or moved on or to the volume in use.

The volume range information 28650 is used to define range information for each volume, and, in the example shown in FIG. 26, the definition is made starting from a volume with a wider logical range to a volume with a narrower logical range.

Now, under such circumstances, it is assumed that the volume A is designated and a volume to which the volume A is copied or moved is searched.

A user will designate the volume A through a control console (not shown in the diagram) via the network 2100.

In this case, the possible data arrangement range of data in the volume A is "Office B" as shown in FIG. 24, and the free space is "8124" MB as shown in FIG. 25.

Further, the range information of the volume D in terms of office unit is "Office B" as shown in FIG. 26, the status of use is "Unused", and the free space is "13328" MB.

Consequently, since the possible data arrangement range of the data in the volume A is included in the range information in office unit of the volume D, free space is sufficiently available and the status of use is "Unused", the volume D will be a candidate to be selected.

Hereinafter, processing of the volume selection program 28800 in the management computer 2000 will be described with reference to FIG. 27.

At the time of initiating the processing, the program 28800 receives, as parameters, the capacity of a volume to be assigned and the possible data arrangement range information of the data.

First, a judgment is made as to whether or not there is an unsearched volume is available in the list of volumes 28600 (step 31150).

If there is no unsearched volume, the processing is terminated.

If unsearched volumes are available, one of the volumes is selected (step 31200).

Then, the range information of the volume is acquired by referring to the volume range information 28650 shown in FIG. 26.

A judgment is made as to whether or not the possible data arrangement range information that is delivered as a parameter exists in the volume range information 28650. If the information is not available in the volume range information 28650, then, the processing is resumed at the step 31150 to search for the next volume.

When the possible data arrangement range information exists in the volume range information 28650, then, referencing is made to the list of volumes information 28600 in FIG. 25, and a judgment is made as to whether the volume is unused or not (step 31350).

When the volume is not "unused", the processing is resumed at step 31150 to search for the next volume.

When the volume is "unused", then, the capacity of the data delivered in parameter is compared to the capacity of the volume to make a judgment as to whether the volume capacity is enough or not (step 31400).

If the volume capacity is not enough, the processing is resumed at step 31150 to search for the next volume.

If the volume capacity is enough, the volume is selected and necessary information is displayed on a control console, etc. (step 31450).

In the third embodiment, the volume selection program 28800 in the memory 28200, list of volumes information 28600, and volume range information 28650 are stored in the storage device 2030 or the storage device 2040. They may however be stored in a storage device that is incorporated in or directly connected to the management computer 2000, or in any storage device connected to the network 2100.

In addition, the above-stated program and data may be decentralized and stored in the management computer 2000, the host computers 2010 and 2020, and the storage devices 2030 and 2040 so that they may jointly operate. For example, a volume selection section that is located in the memory 28200 on the management computer 2000 may designate conditions to a volume selection unit that is located on the storage devices 2030 and 2040, inquires whether or not a volume that satisfies such conditions, searches for a volume that satisfies such conditions on the storage devices 2030 and 2040, and returns the search result.

Further, in the third embodiment, the capacity and the possible data arrangement range are designated at the time of assigning a volume, but items to be designated are not limited to such items. For example, the number of physical disks or the number of redundant disks that configure a volume may be designated along with the items stated above, or an average request performance value may be designated. In addition, upon designation of capacity, one or more usable volumes may be displayed according to possible data arrangement ranges. Alternatively, upon designation of a volume, one or more volumes having the same possible data arrangement range as that of the above-stated volume may be displayed.

In the third embodiment, processing is terminated when one volume that satisfies the designated conditions is found. Alternatively, however, a search may be made for all volumes or the number of volumes designated in advance that satisfy the designated conditions. At this time, search results may be exposed and displayed to users so that users can choose one volume among volumes thus displayed. Further, when search results are displayed, the display method may be changed depending on which possible data arrangement ranges volumes are included in.

In the embodiment, a method for searching for a volume is shown, but a search may be made for storage areas including a file system and logical volumes. Further, a file system, a logical volume or a volume may be searched for at a time. Further, a search may be made, by designating a file, for a file system which is in the possible data arrangement range of the above-stated file and has free space exceeding the size of the file. Alternatively, by designating both the capacity and the possible data arrangement range, a search may be made for all volumes which are in the above-stated possible data arrangement range and whose total capacity exceeds the above-stated capacity as a result of such search.

In the embodiment, a method for searching a copiable storage area by designating the data range information and the free space. Alternatively, however, the embodiment may easily be applied to a logic wherein, by designating the possible data arrangement range and the capacity at the time of making a copy, copying is permitted when the range information of the copy-destination storage area is included in the possible data arrangement range and there is free space in the copy-destination storage area.

Fourth Embodiment

Figure 28:
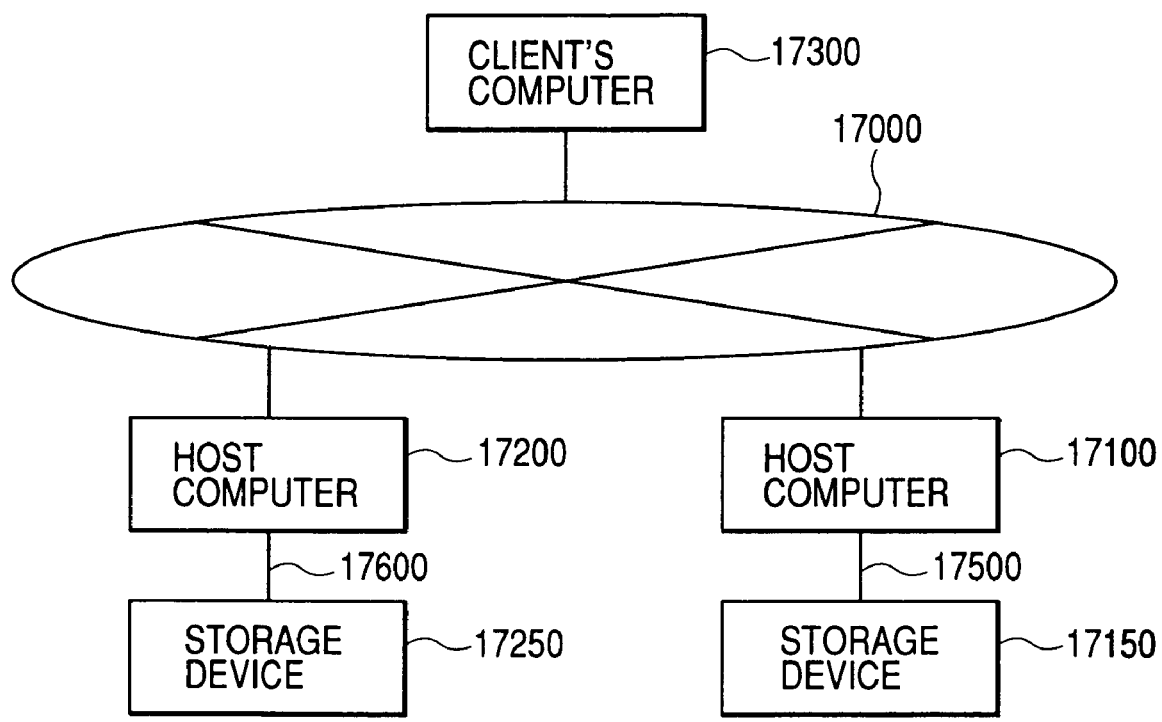
FIG. 28 is a configuration diagram of a computer system according to a fourth embodiment of the present invention.
Figures 29, 30:
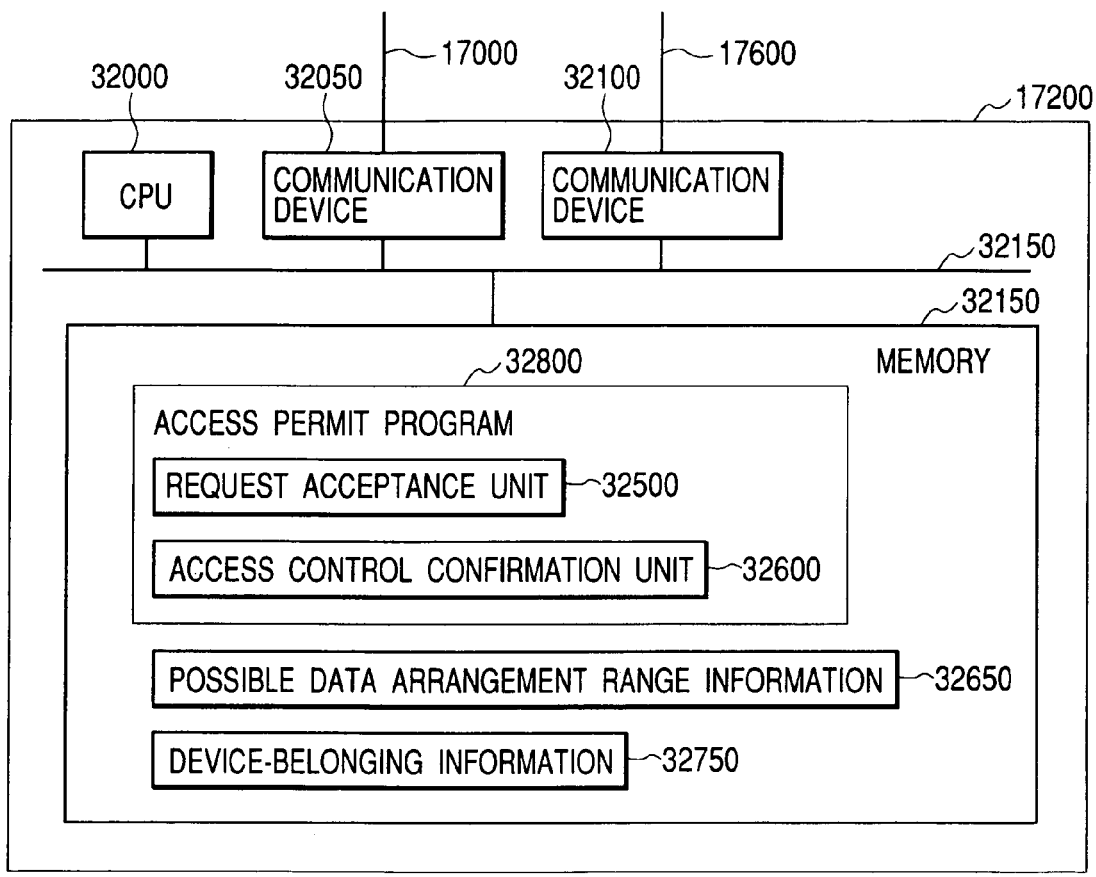
FIG. 29 is an internal configuration diagram of a host computer according to the fourth embodiment of the present invention.
FIG. 30 is a diagram showing device-belonging information.

Hereinafter, a fourth embodiment according to the present invention will be described with reference to FIGS. 28 through 32. FIG. 28 is a configuration diagram of a computer system associated with the fourth embodiment of the present invention. FIG. 29 is an internal configuration diagram of a host computer associated with the fourth embodiment of the present invention. FIG. 30 is a diagram showing device-belonging information. FIG. 31 is a diagram showing a possible data arrangement range and typical range information associated with the fourth embodiment of the present invention. FIG. 32 is a flow chart showing processing in the access control confirmation unit 32600.

The fourth embodiment refers to a method for managing a storage area which, for a case that an access is made to a certain storage area from a client computer, permits or does not permit data accessing by comparing the device-belonging information of the client computer with the possible data arrangement range of the data to be accessed.

Regarding the system configuration in the embodiment, it shall be so understood that, as shown in FIG. 28, a client computer 17300, a host computer 17100, and a host computer 17200 are connected each other via a network 17000, and a storage device 17250 is connected to the host computer 17100, and a storage device 17150 is connected to the host computer 17200, respectively.

Further, the client computer 17300 will make an access to data in a storage area of the storage device 17150 to which the host computer 17200 is connected.

As for the internal configuration of the computer 17200, a CPU 32000, a communication device 32050, a communication device 32100 and a memory 32159 exist, and they are connected each other via a communication path 32150, as shown in FIG. 29.

Further, the communication device 32050 is connected to the network 17000, and the communication device 32100 is connected to the communication path 17600. In addition, in the memory 32150, an access permit program 32800, possible data arrangement range information 32650 and device-belonging information 32750 exist.

Furthermore, in the access permit program 32800, a request acceptance unit 32500 and a access control conformation unit 32600 exist.

The access permit program 32800 is a program stored in the storage device 17250 that is connected to the communication device 17600, read into the memory 32150, and executed by the CPU 32000.

The possible data arrangement range information 32650 and the device-belonging information 32750 are data that is stored in the storage device 17250 connected to the communication path 17600, and is used when the access range setting program 32800 is executed.

The device-belonging information 32750 is information that indicates a logical belonging range at the time of making a data access from a client computer, as shown in FIG. 30.

Further, the storage device 17150 has a storage device hierarchy comprising a logical volume I, a file system D, a file E and a file F as shown in FIG. 31, and the possible data arrangement range of the file E shall be "Department R", while the possible data arrangement range of the file F shall be "Office P." The range information of both the logical volume I and the file system D is "Department R."

Now, it shall be supposed that an access is made to the file E from the client computer A.

The device-belonging information of the client computer A is "Office P", and that of the file E is "Department R." More specifically, the device-belonging information of the client computer A is not included in the possible data arrangement range of the file E.

The above fact means that the client computer A may be used by persons other than those in Department R, and that an access is made to the file E which should not be accessed by persons other than those in Department R. Consequently, the access is rejected in this case.

In addition, the above fact also means that an access is rejected when the client computer A tries to obtain an access permission under the file system D level.

On the other hand, the device-belonging information of the client computer B is "Department R", and accessing to all data in the logical volume I is possible from the client computer B.

Hereinafter, processing of the access control confirmation unit 32600 will be described with reference to FIG. 32.

First, upon acceptance of an access request, the possible data arrangement range information 32650 is acquired (step 37000).

A judgment is made as to whether a possible data arrangement range has been defined or not (step 37050), and if it has not been defined, an access is permitted (step 37400). More specifically, it is assumed that, when any possible data arrangement range is not defined, accessing is possible from all client computers.

Thereafter, the device-belonging information 32750 of a client computer to which an access is being made is acquired (step 37100).

Then, a judgment is made as to whether the device-belonging information 32750 is within the possible data arrangement range 32650 or not (step 37150), and if the device-belonging information 32750 is in the possible data arrangement range 32650, accessing to the data is permitted (step 37400), or if the device-belonging information 32750 is not in the possible data arrangement range 32650, accessing is rejected (step 37450).

In the fourth embodiment, all of the access permit program 32800, the possible data arrangement information 32650, and the device-belonging information 32750 are not necessary to be stored in the storage device 17250 that is connected to the communication path 17600, but they may be located on a storage device incorporated in the host computer 17200 or any other storage devices connected to the network 17000.

Fifth Embodiment

Hereinafter, a fifth embodiment according to the present invention will be described with reference to FIGS. 33 through 36.

The fifth embodiment refers to description of a user interface that is provided to execute the data processing method and storage area management method of the present invention that have been referred to in the foregoing parts.

Figure 33:
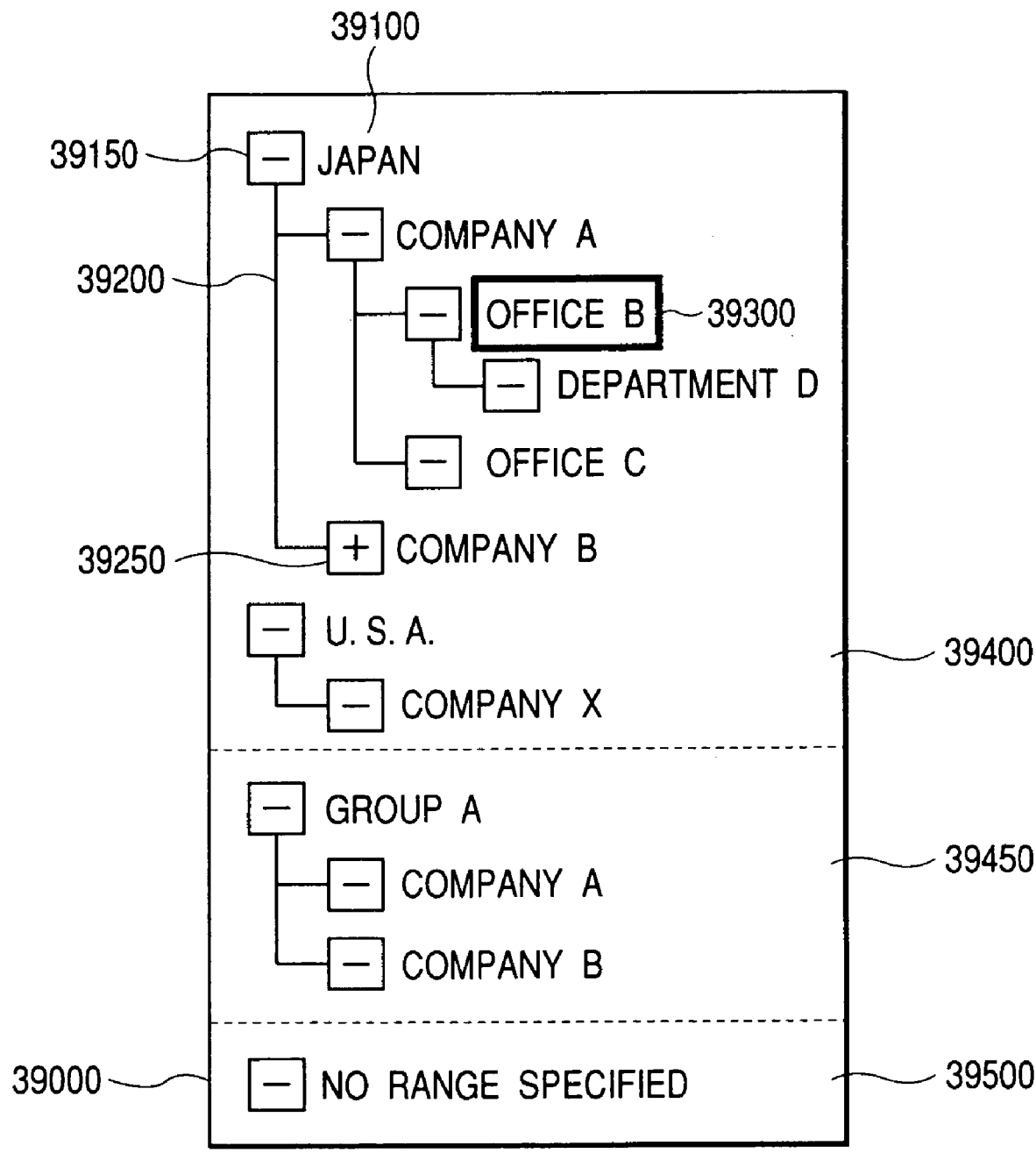
FIG. 33 is a diagram showing a display object that displays a logical range that is targeted for a possible data arrangement range and the range information of a storage area.
Figures 34, 35:
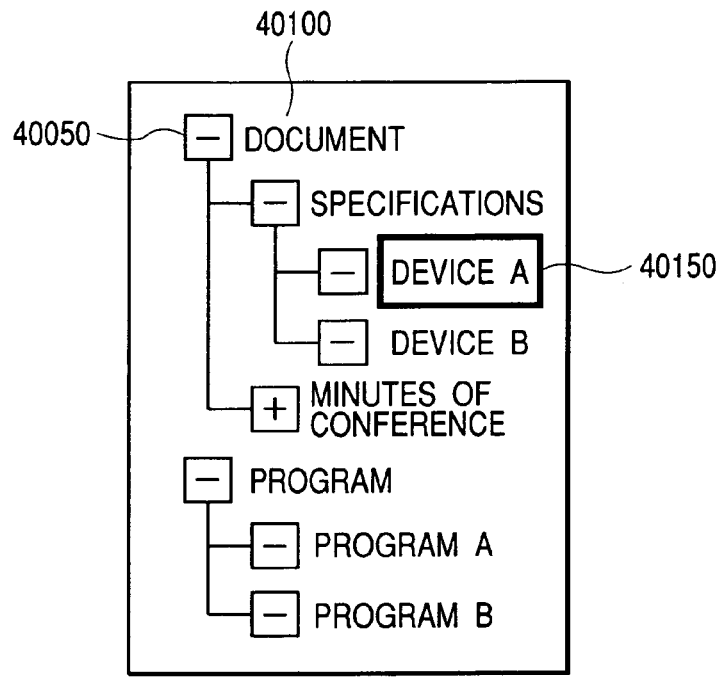
FIG. 34 is a diagram showing an example of a display object displaying a directory configuration to be accessed from a client computer.
FIG. 35 is a diagram showing an example of a display object which expresses a file information list in a table format.

FIG. 33 is a diagram showing a display object which displays a logical range that is intended for range information on a possible data arrangement range and a storage area. FIG. 34 is a diagram showing an example of a display object displaying a directory configuration to be accessed from a client computer. FIG. 35 is a diagram showing an example of a display object which expresses a file information list in a table format.

In order to execute the data processing method and the storage area management method according to the present invention, for example, there is provided a graphical interface which is used to display screens described hereinafter on a display unit that is connected to a management computer of the computer system shown in FIG. 6 or to a client computer which is not shown in the diagram but is connected to the network 2100, or can be operated with input devices such as a mouse and a keyboard.

In a screen which displays a logical range, the logical range is displayed in a tree structure as shown in FIG. 33. The logical range displayed should be the range intended for the possible data arrangement range.

As a logical range is located closer to the root of the tree, the logical range takes a superordinate position, and as it is located closer to the leaf part of the tree, the logical range takes a subordinate position. In FIG. 33, the range "Japan" is in the superordinate position, and ranges of "Company A" and "Company B" are in the subordinate positions. Symbol "+" marked at respective nodes indicates that its subordinate nodes are not shown, and symbol "−" shows that such subordinate nodes are shown. And, pointing a node with a mouse and clicking it toggle indications "+" and "−".

In addition, a display area 39500 is a special area, and it shows that the possible arrangement range is unlimited.

Further, a box 39300 shows that the display area of FIG. 33 is selected by a user to be in an active status.

It shall be understood that a user has a file with a directory configuration shown in FIG. 34, and that the user can make an access to the file. On the screen, a tree structure of the directory is displayed, and, for example, the directory "Specifications" has subordinate directories such as "Device A" and "Device B."

The meaning of symbols "+" and "−" marked at nodes is the same as that of FIG. 33. A box 40150 shows that the display are in FIG. 34 is selected by a user to be in the active status.

When the "Device A" is selected with a mouse, and then a command "display the file list" is entered, a list of files in the directory of the "Device A", and a list of the possible data arrangement range, the format, the size, etc. of the files will be displayed as shown in FIG. 35.

Thereafter, a row 41000 for a file name shown in FIG. 35 is selected with a mouse, and the row thus selected is drugged and dropped on the node of the display object which displays the logical range displayed on the same display unit as that shown in FIG. 33. This will enable the setting of the possible data arrangement range for the file having the file name stated above that is drugged and dropped. For example, by drugging and dropping a file having a file name "Basic Specifications" onto a node displayed as "Office B", the data arrangement range will be "Office B", and thus the corresponding portion of a column 41050 is rewritten.

Here, the term "drug and drop" refers to a series of operations, wherein the pointer of a pointing device is moved to the pointing-out area of an object to be displayed, the object is selected by pressing a mouse button, the object is moved to the pointing-out area of another object to be displayed while the button is pressed and held, and finally the mouse button is released.

Conversely, it may be so arranged that a possible data arrangement range of a file can be set by drugging and dropping the node of the logical range shown in FIG. 33 onto the row which indicates a file in the file list shown in FIG. 35.

It should be noted that, when a file name is drugged and dropped onto the display area 39500, the status of "no range designated" will be established.

Alternatively, it may be so arranged that, by selecting a directory from a display object showing directory structures in FIG. 34, and drugging and dropping the directory onto a node shown in FIG. 33, setting or canceling of a possible data arrangement range for all files in the directory can be made.

Further, when a row showing a file in FIG. 35 is selected, the display method of a portion corresponding to the possible data arrangement range defined for the file in the logical range shown in FIG. 33 may be changed.

Furthermore, it may be so arranged that, when a directory or a file that designates a possible data arrangement range is selected, two or more directories or files are selected, and possible data arrangement ranges of two or more files or directories can be set at a time.

When a possible data arrangement range of a file is designated by using such user interface, it may be so arranged that, if the range is inconsistent with a storage area (e.g. a file system or a logical volume, and range information defined for a volume, etc. in a storage device) which includes the designated file, then, the designation of such possible data arrangement range is terminated as an error, a warning is displayed, or an inquiry is made as to whether the setting of the possible data arrangement range is actually executed or not.

For this purpose, a search can be executed whether or not the range information of the storage area including the file is smaller than the designated possible data arrangement range.

Hereinafter, a utility screen which is convenient at the time of using the data processing method and the storage area management method of the present invention will be described with reference to FIG. 36.

Figure 36:
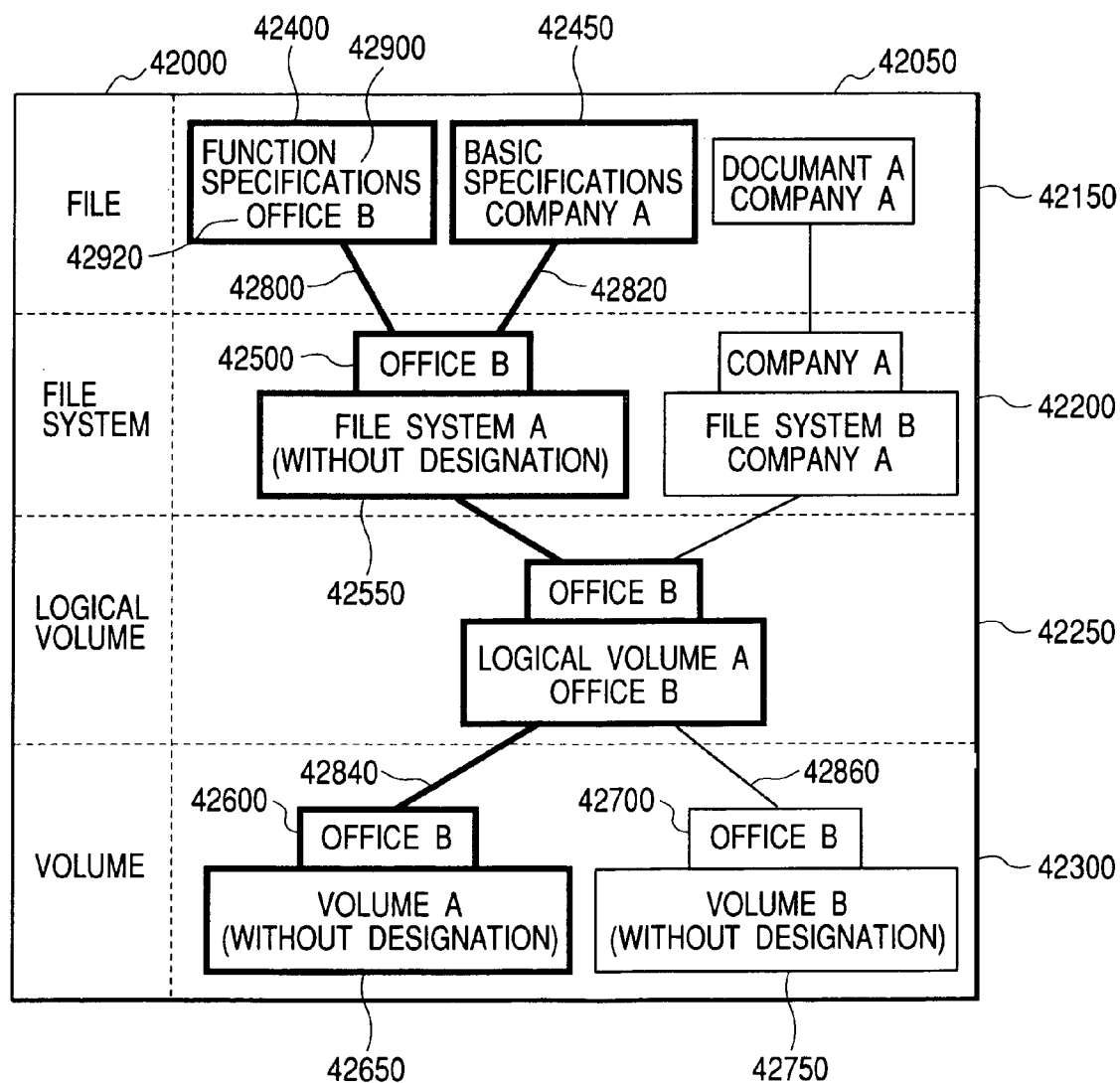
FIG. 36 is a diagram showing a utility screen that is offered when the data processing method and the storage area management method of the present invention is used.

FIG. 36 is a diagram showing a utility screen that is offered when the data processing method and the storage area management method of the present invention is used.

In the utility screen, a storage area belonging to a hierarchy is displayed according to the hierarchies of storage area.

The horizontal lines show that the intended objects of the lower storage area include storage areas or data of the upper storage area.

For example, a file 42400 of "Function Specifications" and a file 42450 of "Basic Specifications" are included in a file system 42750 of a "File System A."

The character string 42920 at the lower part of the file 42400 "Function Specification" shows that the possible data arrangement range is "Office B."

Likewise, an upper box 42500 of the "File System A" is typical range information of the file system. This should be the narrowest possible data arrangement range among those in a file belonging to the file system "File System A." Here, since the possible data arrangement range of the file "Function Specifications" was "Office B" and the possible data arrangement range of the function specifications was "Company A", the range should be the narrower range, or "Office B." At this time, the file 42400 of "Function Specifications" which has narrower possible data arrangement range "Office B" is shown in bold lines as shown in FIG. 36, or the display color is changed.

Further, what is located at the lower part of a box 42750 is range information that is defined for the file system "File System A." In this case, since it is defined as "without designation", no particular designation is made.

As stated in the above, displaying is sequentially made down to the volume which is in the lowest hierarchy for its typical range information, name of storage area, and defined range information.

At this time, the storage area or data which is indicated in a bold line box will have the typical range information and the possible data arrangement range in the narrowest logical range. More specifically, it is possible to say that a daisy chain of such storage areas or data shown with bold lines forms a "critical" part at the time of making a copy to other storages areas. Therefore, should any error occur during a copying or a migration process, verification on the storage area shown in bold lines or the daisy chain of data will reveal the storage area portion or data that caused such unsuccessful copying or migration. This can be used when a storage area or data is to be re-arranged.

For example, it shall be supposed that, in the example shown in FIG. 36, "Volume A" is specified and copying to another volume having the range information "Company A" is tried. In this case, since the typical range information of the "Volume A" is "Office B", copying will not be feasible. Eventually, it is found that the cause lies in the fact that the possible data arrangement range of the file "Function Specifications" is "Office B."

In addition, since the range information of a storage area is displayed, verification is possible, should an error occur in trying to make a copy from other storage area to the storage area presently displayed. Further, should an error due to inconsistency occur at the time of defining range information of a storage area or a possible data arrangement range of data, the cause can be investigated.

In the data processing method and the storage area management method of the present invention, if the range information defined to a storage area B included in a certain storage area A is considered to be logically wider than the range information defined to the storage area A, it should be arranged that the processing is treated as an error or a warning is issued. This includes a case, for example, where the range information of a logical volume is "Office B", and the range information of a file system in that volume is "Department D." In such a case, data in the logical volume may be accessed by all persons in Office B. Should such situation happen, the cause can easily be inquired into by using the utility screen shown in FIG. 36.

Other Embodiments

In the first and the second embodiment, a possible data arrangement range and the range information of a storage area were verified at the time of making a copy. However, such verification processing may be performed, not at the time of making a copy, but at the time of defining that copying will be made in the future by using backup software, etc.

Further, at the time of copying volume data in the first embodiment, verification was made on the possible data arrangement range and the volume range information, but verification is conducted within a data copy program in the copy-source storage device.

In the first and the second embodiment, at the time of copying data in a storage device, if the possible data arrangement range does not include the range information of the storage device, the copy processing is aborted as an error. However, a user may judge whether copying should be executed or not after confirming the user that the copying is made beyond the possible arrangement range of the data, or the copy processing may be executed as requested by warning a user of such processing.

In the first and the second embodiment, there was explained an example wherein, at the time of copying data between volumes, logical volumes and file systems in a storage device, the possible arrangement range of the data is confirmed. However, at the time of copying a file or a volume to a removable external storage device, it may also be arranged to examine as to whether or not the range information of a pre-defined external storage device is within the range of the storage area to be copied. The typical examples include an arrangement wherein, for a floppy (registered trademark) disk drive, defining it always to be "external" will prevent any intra-company secret data from being copied to any floppy (registered trademark) disk.

At the time of making data copying between storage devices, pre-defined processing may be executed if the range information of the copy-destination storage area is beyond the possible arrangement range of data in the copy-source storage area, and copying data between the storage devices may be executed when the processing is successful, or the copying may not be executed when the processing is failed. The pre-defined processing includes, for example, encryption of part or all of data, examination as to whether or not an authorization has been given to bring data beyond a possible arrangement range, displaying of pre-defined messages, and recording of history of copy made beyond a possible arrangement range.

By providing two or more possible data arrangement range to any data, different definitions may be given to each range in such a manner that copying is prohibited at the time of making a copy of data beyond the range; a warning is issued, but copy is executed; or processing is executed in advance at the time of making a copy. For example, the definitions include that a record is taken for a copy being made beyond a department, a warning is issued for copy being made beyond an office, and copying to outside a company is prohibited.

For a possible data arrangement range referred to in the embodiments, a logical range according to an organization is used. However, the range may be applied to any and all relationship whose inclusive relations can be logically defined. For example, for the possible data arrangement range, a physical range (a range within the premises of an office, a security protected room, etc.), or any pre-defined logical group (set of equipment identifiers) can be used. Alternatively, by designating such conditions that a storage device or a host computer has an authentication function, a range is pre-registered in a database, or the present invention is applied (data leakage beyond the possible arrangement range is restricted even at the copy destination), a storage device or a host computer that satisfies the conditions may be in the range.

Also, an expiration date may be given to a possible data arrangement range. For example, the possible data arrangement range will be "Office B" until a pre-specified date, and after such data, the possible data arrangement range will be "Company A" (the logical range shown in FIG. 2 is prerequisite).

In the first through the third embodiments, at the time of making data copying, a search was made as to whether the copy is made beyond the possible data arrangement range or not, but the search may be made at the time of a data migration. Also, at this time, data migration may be executed for the designation of migration within a possible data arrangement range, and data copying may be executed for the designation of migration beyond the possible data arrangement range.

In addition, in the data processing method and the storage range management method of the present invention, processing may be so designed that, by executing data migration in a storage range, all data can be retained within a possible data arrangement range at the time of executing a resource re-arrangement function to distribute loads or to improve performance.

Next, when any description of a group definition referred to in the first embodiment is changed, there is a possibility regarding some data that the possible data arrangement range is not retained after the change in the group definition, though possible arrangement range of all data was retained before such change. Further, when an operation only to issue a warning without prohibiting copying is executed for a request for data copying beyond a possible data arrangement range, it is sometimes required to know where data that is available beyond the possible arrangement range is located. For such purposes, such function that acquires a list of data that is included in the designated storage range and are placed beyond a possible data arrangement range may be provided for all storage ranges (all volumes in a designated storage device, all file systems in a designated organization, etc.) that are available in the designated range.

In a program to process data for file format conversion, file encryption, etc., the possible arrangement range of data before processing may be specified as the possible arrangement range of data after processing. Also, in a program to handle data and storage areas such as an operating system or a logical volume manager, for all data that is written by a process which opened a file to which a possible data arrangement range is designated, the above-stated possible data arrangement range may be automatically set.

In addition, a process which has opened, if once, a file whose possible data arrangement range is restricted, or a process which is currently executing to open a file may be restricted so that data transfer to any storage area beyond the possible data arrangement range cannot be executed. Further, the restriction may be taken up by a process that is generated out of the above-stated processes. This is an arrangement, for example, for a user who is executing a process for file open that contains a possible data arrangement range of "Department D" not to leak out secret information, since the user handles secret information of Department D.

In order to support the data processing method and the storage area management method of the present invention, for a case that a user uses a program having a function to store a file, a dialogue to allow the user to designate the possible data arrangement range of a file to be stored may be displayed before or after entering the name of the file to be stored, make the user designate a possible data arrangement range, and the range thus designated may be recorded as the possible data arrangement range of that file.

Furthermore, in a program to display a list of descriptions of storage areas, a method for displaying a storage area having range information within a logical range specified by a user and a method for displaying other storage areas may be changed.

In a storage area that is configured with two or more different groups of storage areas, a judgment is made as to whether range information of a storage area which forms each element of a storage area group are all same or not, and if the information are not same, means for issuing a warning may be provided. One example is that, in a logical volume that is configured with two volumes located in a storage device, a warning is issued if the range information of logical volumes of volumes located in the storage device. Alternatively, processing may be interrupted or a warning may be issued at the time of configuring a storage area from storage area groups, if even one storage area having different range information exists among storage areas that are elements of the storage area group is different.

It should be noted that a program that is executed in respective embodiments is executed on a computer. However, for the distribution of such program, the program may be provided in computer readable recording media such as a CD or a ROM, or may be provided by being downloaded from a server through networks including the Internet.

Advantages of the Present Invention that Become Apparent from Respective Embodiments As may be apparent from respective embodiments, according to the present invention, it is possible to provide a data processing method which prevents violation of rules or leaking out of secret information attributed to erroneous operation of an administrator, thus enabling data management that offers excellent confidentiality, in making copies of corporate business data, etc.

What is claimed is:

1. A computer comprising:
a network interface arranged to be coupled via a network to a storage apparatus including a controller and logical volumes controlled by the controller;
a CPU connected to the network interface;
wherein information of a requirement of an access source that can access data via a network is defined for the data,
wherein information that data being accessed by the access source can be located in a first logical volume of the logical volumes is defined for the first logical volume, and
wherein the CPU refers to the requirement in the information of the data, specifies a second logical volume of said logical volumes as having information defined therefor corresponding to the specified requirement, and sends an instruction to the storage apparatus via the network interface in accordance with the specification.

2. A computer according to claim 1,
wherein the network interface is arranged to be coupled via a network to a plurality of the storage apparatus, the first logical volume is in a first storage apparatus of the plurality of storage apparatus, the second logical volume is in a second storage apparatus of the plurality of storage apparatus different from the first storage apparatus, and the second storage apparatus is arranged to be coupled to the first storage apparatus via a network;
wherein the CPU determines whether the second logical volume of said logical volumes is a volume for destination of copy for data stored in the first logical volume of said logical volumes, according to both the information defined for the second logical volume and the information defined for the data,
wherein the CPU sends, to the storage apparatus via the network interface, an instruction for copying the data from the first logical volume to the second logical volume when the information defined for the second logical volume corresponds to the information defined for the data, and
wherein the instruction for copying the data is to send the data from the first storage apparatus to the second storage apparatus.

3. A computer comprising:

a network interface arranged to be coupled via a network to a storage apparatus, said network interface including a controller and logical volumes connected to controlled by the controller; and a CPU connected to the network interface;

wherein the CPU determines whether a second logical volume of said logical volumes is a volume for destination of copy for data stored in a first logical volume of said logical volumes, according to both of information defined for the second logical volume and of information defined for the data, wherein the CPU sends, to the storage apparatus via the network interface, an instruction for copying the data from the first logical volume to the second logical volume when the information defined for the second logical volume corresponds to the information defined for the data, wherein the information defined for the data defines a requirement of an access source that can access the data via a network, wherein of information defined for the first logical volume defines that data being accessed by the access source can be located in the first logical volume, and wherein the CPU refers to the requirement in the information defined for the data, specifies the second logical volume as having information defined therefor corresponding to the specified requirement, and sends the instruction to the storage apparatus via the network interface in accordance with the specification.

4. A computer according to claim 3:

wherein a plurality of the data stored in the first logical volume are files, wherein information defined for the files include more than two different requirements of an access source, and wherein the CPU refers to information defined for each of the files when a plurality of the files in the first logical volume are copied to the second logical volume, and specifies the requirement of an access source as a minimum requirement in the referred information defined for the file.

5. A computer according to claim 3:

wherein the CPU specifies the second logical volume further according to both capacity of the searched second logical volume and amount of the data to be copied.

6. A computer system comprising:

at least one host computer used by a plurality of access sources;

a first storage apparatus that is coupled to the host computer via a network and that includes a first storage area in which a plurality of data are stored, the data being permitted to be accessed by a predefined first access source via the network, and the first storage area being provided to the predefined first access source corresponding to the data in the first storage area; and a second storage apparatus that is coupled to the first storage apparatus via a communication line and that includes a plurality of second storage areas provided to a predefined second access source using the host computer, the second storage areas being related to the first storage area;

wherein the first storage apparatus checks which access source is permitted to access data in the first storage area, and sends, to the second storage apparatus via the communication line, the data in the first storage area and results of the check related to the access source permitted to access the data in the first storage area, and wherein the second storage apparatus receives, from the first storage apparatus via the communication line, the data in the first storage area and the results of the check, compares the results of the check and the predefined second access source to which the second storage area is provided, specifies a second storage area in which to copy the data according to the second access source permitted to access the copied data included in the results of the check, and copies the data to the specified second storage area.

7. A computer system according to claim 6, wherein the first storage apparatus specifies which access source is included in the other access sources among the checked access sources, the access source relating to the access source being the specified access source.

8. A computer system according to claim 7, wherein the data stored in the first storage area is a file, a plurality of the files are configured to a file system, and wherein the CPU further checks which access source is permitted to access the file system in the first storage area.

9. A computer system according to claim 6, wherein the second storage apparatus receives a capacity of data to be copied, and the second storage apparatus specifies the second storage area to which data is copied according to the capacity of the data and the capacity of the second storage area.

* * * * *